United States Patent
Guan et al.

(10) Patent No.: US 11,316,579 B2
(45) Date of Patent: Apr. 26, 2022

(54) COMMUNICATION METHOD AND COMMUNICATIONS APPARATUS

(71) Applicant: HUAWEI TECHNOLOGIES CO., LTD., Shenzhen (CN)

(72) Inventors: Peng Guan, Chengdu (CN); Xi Zhang, Ottawa (CA); Ying Sun, Chengdu (CN); Ziming Yu, Chengdu (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 36 days.

(21) Appl. No.: 16/784,306

(22) Filed: Feb. 7, 2020

(65) Prior Publication Data
US 2020/0177265 A1    Jun. 4, 2020

Related U.S. Application Data

(63) Continuation of application No. PCT/CN2018/096984, filed on Jul. 25, 2018.

(30) Foreign Application Priority Data

Aug. 11, 2017   (CN) .......................... 201710684270.2

(51) Int. Cl.
*H04B 7/08* (2006.01)
*H04B 7/06* (2006.01)
(Continued)

(52) U.S. Cl.
CPC .......... *H04B 7/088* (2013.01); *H04B 7/0626* (2013.01); *H04L 5/0051* (2013.01);
(Continued)

(58) Field of Classification Search
CPC .... H04B 7/088; H04B 7/0626; H04B 17/318; H04B 17/336; H04B 7/0695;
(Continued)

(56) References Cited

U.S. PATENT DOCUMENTS

2015/0110031 A1   4/2015  Takeda et al.
2015/0341882 A1   11/2015 Davydov et al.
(Continued)

FOREIGN PATENT DOCUMENTS

CN    104335651 A    2/2015
CN    104813602 A    7/2015

OTHER PUBLICATIONS

Catt, Discussion on DL beam recovery, 3GPP TSG RAN WG1 Meeting #89, Hangzhou, China, May 15-19, 2017, R1-1707477. (Year: 2017).*

(Continued)

*Primary Examiner* — Shailendra Kumar
(74) *Attorney, Agent, or Firm* — Rimon PC

(57) ABSTRACT

A communication method and a communications apparatus. The method includes: receiving configuration information of at least one frequency resource group, and receiving, by using at least one beam, a downlink signal on a corresponding frequency resource in the at least one frequency resource group, wherein each frequency resource group comprises at least two frequency resources, each frequency resource corresponds to at least one beam, and the configuration information comprises an identifier of each frequency resource group and an identifier of each frequency resource; and when it is detected based on the downlink signal that a beam associated with a first frequency resource in the frequency resource group fails, sending a beam recovery request on a second frequency resource in the frequency resource group. Correspondingly, a corresponding apparatus is further disclosed.

9 Claims, 20 Drawing Sheets

(51) Int. Cl.
*H04L 5/00* (2006.01)
*H04W 72/04* (2009.01)
*H04W 76/11* (2018.01)
*H04W 56/00* (2009.01)

(52) U.S. Cl.
CPC ....... *H04W 56/001* (2013.01); *H04W 72/042* (2013.01); *H04W 72/0453* (2013.01); *H04W 76/11* (2018.02)

(58) Field of Classification Search
CPC . H04W 76/11; H04W 56/001; H04W 72/042; H04W 72/0453; H04W 24/04; H04W 16/28; H04W 24/02; H04L 5/0051
See application file for complete search history.

(56) References Cited

U.S. PATENT DOCUMENTS

| | | | |
|---|---|---|---|
| 2018/0191422 A1* | 7/2018 | Xia | H04B 7/061 |
| 2018/0206170 A1* | 7/2018 | Nagaraja | H04B 7/0408 |
| 2019/0053314 A1* | 2/2019 | Zhou | H04B 7/0695 |

OTHER PUBLICATIONS

Catt, L3 Mobility based on CSI-RS based Measurements, 3GPP TSG RAN WG1 NR Ad-Hoc#2, Qingdao, P.R. China Jun. 27-30, 2017, R1-1711576 (Year: 2017).*

Catt, "Discussion on DL beam recovery", 3GPP TSG RAN WG1 Meeting #89, R1-1707477, Hangzhou, China, May 15, 2017, total 6 pages.

Zte, "Discussion on beam recovery mechanism" 3GPP TSG RAN WG1 NR Ad-Hoc#2, R1-1710185, Qingdao, P.R. China Jun. 27, 2017, total 10 pages.

Vivo, "Beam failure recovery procedure", 3GPP TSG RAN WG1 Meeting NR Ad-Hoc#2, R1-1710400, Qingdao, P. R. China, Jun. 27, 2017, total 6 pages.

Catt, "L3 Mobility based on CSI-RS based Measurements",3GPP TSG RAN WG1 NR Ad-Hoc#2, R1-1711576, Qingdao, P.R. China Jun. 27, 2017, total 8 pages.

Samsung, "Beam Management for PDCCH",3GPP TSG RAN WG1 Meeting NR AH2, R1-1711604, Qinadao. China, Jun. 27, 2017, total 6 pages.

Zte, et al., "QCL/QCB design for DL MIMO," 3GPP TSG RAN WG1, Meeting #88, R1-1701819, Agenda Item: 8.1.2.4.5, Athens, Greece, Feb. 13, 2017.

3rd Generation Partnership Project;, 3GPP TS 36.321 V14.3.0 (Jun. 2017), 3rd Generation Partnership Project; Technical Specification Group Radio Access Network; Evolved Universal Terrestrial Radio Access (E-UTRA); Medium Access Control (MAC) protocol specification(Release 14), 107 pages.

3GPP TS 36.211 V12.4.0 (Dec. 2014),3rd Generation Partnership Project;Technical Specification Group Radio Access Network;Evolved Universal Terrestrial Radio Access (E-UTRA);Physical channels and modulation(Release 12),total 124 pages.

3GPP TS 36.212 V13.0.0 (Dec. 2015),3rd Generation Partnership Project;Technical Specification Group Radio Access Network;Evolved Universal Terrestrial Radio Access (E-UTRA);Multiplexing and channel coding(Release 13),total 121 pages.

3GPP TS 36.213 V13.0.0 (Dec. 2015),3rd Generation Partnership Project;Technical Specification Group Radio Access Network;Evolved Universal Terrestrial Radio Access (E-UTRA);Physical layer procedures(Release 13),dated 2015, total 326 pages.

3GPP TS 36.331 V13.0.0 (Jan. 2016),3rd Generation Partnership Project;Technical Specification Group Radio Access Network;Evolved Universal Terrestrial Radio Access (E-UTRA);Radio Resource Control (RRC);Protocol specification (Release 13),total 507 pages.

3GPP TS 38.331 V0.0.4 (Jun. 2017), 3rd Generation Partnership Project; Technical Specification Group Radio Access Network; NR; Radio Resource Control (RRC); Protocol specification(Release 15 ), 22 pages.

* cited by examiner

COMMUNICATION METHOD AND COMMUNICATIONS APPARATUS

CROSS-REFERENCE TO RELATED APPLICATIONS

This application is a continuation of International Application No. PCT/CN2018/096984, filed on Jul. 25, 2018, which claims priority to Chinese Patent Application No. 201710684270.2, filed on Aug. 11, 2017. The disclosures of the aforementioned applications are hereby incorporated by reference in their entireties.

TECHNICAL FIELD

This application relates to the field of communications technologies, and in particular, to frequency resource configuration.

BACKGROUND

By using frequency resource aggregation technology, a network device can allow a plurality of frequency resources to serve one terminal device. This greatly increases bandwidth and further improves a transmission rate. A quasi co-location (QCL) relationship means that a plurality of resources have one or more same or similar communication features.

On a plurality of adjacent frequency resources, two antenna ports may have a QCL relationship with respect to at least one parameter such as delay spread, Doppler spread, a Doppler frequency shift, an average delay, or a spatial parameter. The spatial parameter is used as an example. FIG. 1a is a schematic diagram of distribution of received power with respect to angles of arrival (AOA). Distribution of received power of a plurality of frequency resources with respect to the angles of arrival has a close similarity, and it may be considered that there is a spatial quasi co-location (spatial QCL) relationship between the two frequency resources. In this way, it may be desirable to use a communication feature of one frequency resource to serve communication of the plurality of frequency resources, to thus reduce a delay and overheads caused by management of each frequency resource. However, adjacent frequency resources might not have a spatial QCL relationship. FIG. 1b is another schematic diagram of distribution of received power with respect to angles of arrival, in which distribution of received power of a plurality of frequency resources with respect to the angles of arrival has a relatively low similarity. In this case, separate management may be needed for each frequency resource. A plurality of factors affect whether or not there is a QCL relationship between a plurality of adjacent frequency resources. Frequency resource configuration by using a QCL relationship helps improve accuracy of the frequency resource configuration, but there is no pragmatic solution in the prior art for determining a QCL relationship between frequency resources to perform the frequency resource configuration.

Therefore, how the network device configures the frequency resource is an urgent problem to be resolved.

SUMMARY

This application provides a communication method and a communications apparatus, to determine a quasi co-location relationship between frequency resources, so as to configure a frequency resource based on the quasi co-location relationship.

According to one aspect of this application, a communication method is provided, including: configuring, by a network device, at least one frequency resource group, where each frequency resource group includes one or more frequency resources; sending, by the network device, indication information of the at least one frequency resource group to a terminal device; sending, by the network device by using at least one beam, a downlink signal on a corresponding frequency resource in the at least one frequency resource group; and receiving, by the network device from the terminal device, indication information indicating whether a plurality of frequency resources in the at least one frequency resource group have a quasi co-location QCL relationship. In this implementation, specific frequency resource grouping is implemented for each terminal device through information exchange between the network device and the terminal device, so that for one terminal device, the frequency resources in each frequency resource group have a QCL relationship, and therefore the network device may serve the terminal device by using the frequency resource group.

In a possible implementation, before the configuring, by a network device, at least one frequency resource group, the method further includes: obtaining, by the network device, information about one or more frequency resources supported by the terminal device. In this implementation, before configuring the frequency resource group, the network device obtains a frequency resource aggregation capability of the terminal device. In this way, the frequency resource group can be pertinently configured, and frequency resource configuration efficiency can be improved.

In another possible implementation, the method further includes: notifying, by the network device, an updated frequency resource group to the terminal device. In this implementation, if the frequency resource group configured by the network device is updated, the terminal device needs to be notified, and the terminal device re-determines a QCL relationship of the frequency resources in each frequency resource group. To be specific, after the terminal device reports a QCL relationship, the network device needs to notify information about an updated frequency resource group to the terminal device if a frequency resource group originally configured by the network device needs to be updated.

In still another possible implementation, the method further includes: configuring, by the network device, a primary frequency resource for the terminal device. In this implementation, the network device determines, based on beam quality or the like of a frequency resource reported by the terminal device, whether the primary frequency resource needs to be reconfigured for the terminal device.

According to another aspect of this application, a communication method is provided, including: receiving, by a terminal device, indication information of at least one frequency resource group from a network device, where each frequency resource group includes one or more frequency resources; receiving, by the terminal device, a downlink signal from the network device by using at least one beam, where the downlink signal is received on a corresponding frequency resource in the at least one frequency resource group; measuring, by the terminal device, the downlink signal; and reporting, by the terminal device, indication information indicating whether a plurality of frequency resources in the at least one frequency resource group have a QCL relationship. In this implementation, specific frequency resource grouping is implemented for each terminal device through information exchange between the network device and the terminal device, so that for one terminal device, the frequency resources in each frequency resource group have a QCL relationship, and therefore the network device may serve the terminal device by using the frequency resource group.

In a possible implementation, before the receiving, by a terminal device, indication information of at least one frequency resource group from a network device, the method further includes: sending, by the terminal device, information about one or more frequency resources supported by the terminal device to the network device. In this implementation, before the network device configures the frequency resource group, the terminal device reports the frequency resource aggregation capability of the terminal device. In this way, the frequency resource group can be pertinently configured, and frequency resource configuration efficiency can be improved.

In another possible implementation, the measuring, by the terminal device, the downlink signal includes: measuring, by the terminal device, at least one of the following information of the downlink signal: beam indication information, quality information of the downlink signal associated with the one or more frequency resources, or a large-scale channel property of an antenna port.

In still another possible implementation, the method further includes: receiving, by the terminal device, an updated frequency resource group notified by the network device. In this implementation, if the frequency resource group configured by the network device is updated, the terminal device needs to be notified, and the terminal device re-determines a QCL relationship of the frequency resources in each frequency resource group. To be specific, after the terminal device reports a QCL relationship, the network device needs to notify information about an updated frequency resource group to the terminal device if a frequency resource group originally configured by the network device needs to be updated.

In yet another possible implementation, the method further includes: obtaining, by the terminal device based on the indication information indicating whether the plurality of frequency resources in the at least one frequency resource group have a QCL relationship, synchronization information corresponding to one frequency resource in each frequency resource group, where the synchronization information includes uplink synchronization information and/or downlink synchronization information. In this implementation, for frequency resources that have a QCL relationship, only uplink synchronization information and downlink synchronization information of one of the frequency resources needs to be obtained. In particular, for a frequency resource that has a QCL relationship with a primary frequency resource, measuring uplink synchronization information and downlink synchronization information required for uplink and downlink synchronization on the frequency resource may not be performed.

In still yet another possible implementation, the method further includes: after an indication of activating a secondary frequency resource is received from the network device, activating, by the terminal device based on indication information indicating whether the primary frequency resource has a QCL relationship with a plurality of secondary frequency resources, the secondary frequency resource to perform data transmission. In this implementation, for another secondary frequency resource that has a QCL relationship with the primary frequency resource, the secondary frequency resource may be directly used to transmit data, without waiting for eight subframes after the activation indication is received. This improves frequency resource utilization.

Correspondingly, this application further provides a communications apparatus, to implement the foregoing communication method. For example, the communications apparatus may be a chip (such as a baseband chip or a communications chip) or a network device. The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to be coupled to the processor, and stores a program (an instruction) and/or data necessary for the apparatus. Optionally, the communications apparatus may further include a communications interface, configured to support communication between the apparatus and another network element.

In another possible implementation, the communications apparatus may include a processing unit, a sending unit, and a receiving unit. The processing unit is configured to configure at least one frequency resource group, where each frequency resource group includes one or more frequency resources; the sending unit is configured to send indication information of the at least one frequency resource group to a terminal device, where the sending unit is further configured to send, by using at least one beam, a downlink signal on a corresponding frequency resource in the at least one frequency resource group; and the receiving unit is configured to receive, from the terminal device, indication information indicating whether a plurality of frequency resources in the at least one frequency resource group have a quasi co-location QCL relationship.

Optionally, the receiving unit is further configured to obtain information about one or more frequency resources supported by the terminal device.

Optionally, the sending unit is further configured to notify an updated frequency resource group to the terminal device.

Optionally, the processing unit is further configured to configure a primary frequency resource for the terminal device.

When the communications apparatus is a chip, a sending unit may be an output unit, for example, an output circuit or a communications interface; and a receiving unit may be an input unit, for example, an input circuit or a communications interface. When the communications apparatus is a network device, a sending unit may be a transmitter or a transmitter, and a receiving unit may be a receiver or a receiver.

According to still another aspect of this application, a communications apparatus is further provided, to implement the foregoing communication method. For example, the communications apparatus may be a chip (such as a baseband chip or a communications chip) or a terminal device. The foregoing method may be implemented by using software or hardware, or by hardware executing corresponding software.

In a possible implementation, a processor and a memory are included in a structure of the communications apparatus. The processor is configured to support the apparatus in performing a corresponding function in the foregoing communication method. The memory is configured to be coupled to the processor, and stores a program (an instruction) and/or data necessary for the apparatus. Optionally, the communications apparatus may further include a communications interface, configured to support communication between the apparatus and another network element.

In another possible implementation, the communications apparatus may include a receiving unit, a processing unit, and a sending unit. The processing unit is configured to implement a measurement function in the foregoing method, and the receiving unit and the sending unit are separately configured to implement a receiving function and a sending function in the foregoing method. For example, the receiving unit is configured to receive indication information of at least one frequency resource group from a network device, where each frequency resource group includes one or more frequency resources. The receiving unit is further configured to receive a downlink signal from the network device by using at least one beam, where the downlink signal is sent on a corresponding frequency resource in the at least one frequency resource group. The processing unit is configured to measure the downlink signal. The sending unit is configured to report indication information indicating whether a plurality of frequency resources in the at least one frequency resource group have a QCL relationship.

Optionally, the sending unit is further configured to send information about one or more frequency resources supported by the communications apparatus to the network device.

Optionally, the processing unit is further configured to: measure at least one of the following information of the downlink signal: beam indication information, quality information of the downlink signal associated with the one or more frequency resources, or a large-scale channel property of an antenna port.

Optionally, the receiving unit is further configured to receive an updated frequency resource group notified by the network device.

Optionally, the receiving unit is further configured to obtain, based on the indication information indicating whether the plurality of frequency resources in the at least one frequency resource group have a QCL relationship, synchronization information corresponding to one frequency resource in each frequency resource group; and the synchronization information includes uplink synchronization information and/or downlink synchronization information.

Optionally, the processing unit is further configured to: after an indication of activating a secondary frequency resource is received from the network device, activate, based on indication information indicating whether a primary frequency resource has a QCL relationship with a plurality of secondary frequency resources, the secondary frequency resource to perform data transmission.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receiver), and a sending unit may be a transmitter (which may also be referred to as a transmitter).

With reference to the foregoing aspects, in a possible implementation, the frequency resource is a carrier component (CC) or a bandwidth part (BP).

With reference to the foregoing aspects, in another possible implementation, the indication information of the at least one frequency resource group specifically includes at least one of the following information: an identifier of the at least one frequency resource group and an identifier of the one or more frequency resources included in each frequency resource group.

With reference to the foregoing aspects, in still another possible implementation, the indication information indicating whether the plurality of frequency resources in the at least one frequency resource group have a QCL relationship specifically includes at least one of the following information: the identifier of the at least one frequency resource group, the identifier of the one or more frequency resources, the beam indication information, the quality information of the downlink signal associated with the one or more frequency resources, the large-scale channel property of the antenna port, and correlation information of the one or more frequency resources.

With reference to the foregoing aspects, in still yet another possible implementation, the downlink signal is a synchronization signal block or a channel state information-reference signal.

With reference to the foregoing aspects, in a further possible implementation, the indication information indicating whether the plurality of frequency resources in the at least one frequency resource group have a QCL relationship is further used to indicate whether the at least one beam has a QCL relationship, and the at least one beam is a beam for sending or receiving the plurality of frequency resources of the at least one frequency resource group.

According to yet another aspect of this application, a computer-readable storage medium is provided, where the computer-readable storage medium stores an instruction, and when the instruction is run on a computer, the computer is enabled to perform the methods according to the foregoing aspects.

According to still yet another aspect of this application, a computer program product including an instruction is provided, and when the computer program product is run on a computer, the computer is enabled to perform the methods according to the foregoing aspects.

In addition, to improve a transmission rate and efficiency of a wireless communications system, in a 5th generation new radio (5G NR) communications system, a network device and a terminal device communicate with each other by using a beam. A characteristic of the beam is that energy of a signal is concentrated in a direction. The network device and the terminal device may generate a beam by using a beamforming technology. The beamforming technology is specifically a digital beamforming technology, an analog beamforming technology, and a hybrid beamforming technology. The beam communication method can effectively enhance an anti-interference capability of a signal, thereby achieving a comparatively high transmission rate and efficiency. A complex channel environment between the network device and the terminal device causes failure of normal communication. Therefore, a status of a beam failure needs to be quickly and accurately detected, and how to detect the beam failure is a current research focus.

A technical problem to be resolved in another embodiment of the present invention is to provide a communication method, so as to quickly detect the status of the beam failure.

According to one aspect, this application provides a communication method, including: configuring, by a network device, at least one frequency resource group, where each frequency resource group includes at least two frequency resources; sending, by the network device, configuration information of the at least one frequency resource group to a terminal device, where the configuration information includes indication information indicating that the frequency resources in each frequency resource group have a quasi co-location (QCL) relationship; and sending, by the network device by using at least one beam, a downlink signal on a corresponding frequency resource in the at least one frequency resource group, where one frequency resource corresponds to one beam.

The frequency resource indicates a resource used to transmit data in frequency domain, for example, the frequency resource may be a carrier component (CC) or a bandwidth part (BP). The QCL relationship indicates that a plurality of antenna ports have at least one same or similar communication feature. For example, that a carrier component 1 has a QCL relationship with a carrier component 2 means that an antenna port on which the carrier component 1 is sent has a QCL relationship with an antenna port on which the carrier component 2 is sent. For another example, that a beam 1 has a QCL relationship with a beam 2 means that an antenna port on which a downlink signal corresponding to the beam 1 is sent has a QCL relationship with an antenna port on which a downlink signal corresponding to the beam 2 is sent. A same or similar configuration may be used for a plurality of frequency resources that have a QCL relationship, especially for a plurality of frequency resources that have a spatial quasi co-location (spatial QCL) relationship. The network device may send one or more downlink signals on each frequency resource in the frequency resource group by using the at least one beam. The downlink signal includes but is not limited to at least one of a channel state information-reference signal (CSI-RS) and a synchronization signal block (SS block). The configuration information may be sent by using a message such as a radio resource control (RRC) message, a media access control-control element (MAC-CE) message, or downlink control information (DCI).

During implementation of this embodiment of the present invention, the network device sends, to the terminal device, configuration information indicating that a QCL relationship exists in the frequency resource group, and sends a downlink signal on the frequency resource group. In this way, the terminal device may measure, based on the QCL relationship in the frequency resource group, the downlink signal on a plurality of frequency resources that have a QCL relationship, to obtain more measurement opportunities. Compared with single-carrier beam detection, beam detection accuracy can be effectively improved, and a detection time can be reduced.

In a possible design, the configuration information further includes: at least one of a first phase count value and a first phase time window of the frequency resource group; and/or at least one of a first phase count value and a first phase time window of each frequency resource in the frequency resource group.

In a possible design, the configuration information further includes: at least one of a second phase count value and a second phase time window of the frequency resource group; and/or at least one of a second phase count value and a second phase time window of each frequency resource in the frequency resource group.

The first phase count value is a count value specified in a beam detection phase, and the second phase count value is a count value specified in a beam recovery phase. The first phase time window and the second phase time window each are a time interval, the first phase time window is a time window specified in the beam detection phase, and the second phase time window is a time window specified in the beam recovery phase.

In a possible design, the configuration information further includes timing duration of the frequency resource group and timing duration of each frequency resource in the frequency resource group.

In a possible design, the configuration information further includes: an identifier of the frequency resource group, an identifier of a reference frequency resource in the frequency resource group, an identifier of each frequency resource in the frequency resource group, a mapping relationship between the frequency resource in the frequency resource group and a beam, and beam indication information of at least one beam associated with each frequency resource in the frequency resource group.

The reference frequency resource is a frequency resource in the frequency resource group. For example, when the frequency resource is a carrier component, the reference carrier component is a primary carrier component in a carrier component group. When there is no primary carrier component in the carrier component group, the network device specifies a secondary carrier component as a reference carrier component. Each frequency resource in the frequency resource group is associated with at least one beam, and that at least two frequency resources in the frequency resource group have a QCL relationship indicates that any beam associated with the frequency resource has a QCL relationship with any beam associated with another frequency resource. For example, the frequency resource group includes a frequency resource 1 and a frequency resource 2, the frequency resource 1 is associated with a beam 11 and a beam 12, the frequency resource 2 is associated with a beam 21 and a beam 22, and that the frequency resource 1 and the frequency resource 2 have a QCL relationship indicates that the beam 11 and the beam 21 have a QCL relationship, or that the beam 11 and the beam 22 have a QCL relationship, or that the beam 12 and the beam 21 have a QCL relationship, or that the beam 12 and the beam 22 have a QCL relationship. The beam indication information is used to indicate an identifier of a beam, and different beams have different beam indication information. The beam indication information includes at least one of a beam number, a downlink signal resource number, an absolute index of the beam, a relative index of the beam, a logical index of the beam, an index of an antenna port corresponding to the beam, an index of an antenna port group corresponding to the beam, an index of a downlink signal corresponding to the beam, a time index of a downlink synchronization signal block corresponding to the beam, beam pair link (BPL) information, a transmit parameter (Tx parameter) corresponding to the beam, a receive parameter (Rx parameter) corresponding to the beam, a transmit weight corresponding to the beam, a weight matrix corresponding to the beam, a weight vector corresponding to the beam, a receive weight corresponding to the beam, an index of the transmit weight corresponding to the beam, an index of the weight matrix corresponding to the beam, an index of the weight vector corresponding to the beam, an index of the receive weight corresponding to the beam, a receive codebook corresponding to the beam, a transmit codebook corresponding to the beam, an index of a receive codebook corresponding to the beam, or an index of the transmit codebook corresponding to the beam. The downlink signal includes any one of a channel state information-reference signal (CSI-RS), a cell-specific reference signal (CS-RS), or a UE-specific reference signal (US-RS). Optionally, the network device may further allocate a QCL identifier to beams that have a QCL relationship in beams associated with the frequency resource group, to indicate the beams that have a QCL relationship in the frequency resource group.

In a possible design, the configuration information further includes: at least one of an antenna port number, a time-frequency resource location, and a period of a downlink signal on each frequency resource in the frequency resource group.

Downlink signals on different frequency resources may have a same configuration or have different configurations. For example, periods of downlink signals on different frequency resources are different.

In a possible design, all beams associated with the frequency resource group have a QCL relationship.

In a possible design, the configuration information further includes: QCL information of beams that have a QCL relationship in the beams associated with the frequency resource group and QCL identifiers of the beams that have a QCL relationship in the beams associated with the frequency resource group.

According to a second aspect, this application provides a communication method, including: receiving, by a terminal device, configuration information of at least one frequency resource group from a network device, and receiving, by using at least one beam, a downlink signal on a corresponding frequency resource in the at least one frequency resource group, where each frequency resource group includes at least two frequency resources, each frequency resource is associated with at least one beam, and the configuration information includes information indicating that frequency resources in each frequency resource group have a quasi co-location QCL relationship; and monitoring, by the terminal device, the downlink signal.

In a possible design, the configuration information further includes at least one of a first phase count value N1 and a first phase time window W1 of the frequency resource group, the frequency resource group is any one of the at least one frequency resource group, and the monitoring, by the terminal device, the downlink signal specifically includes:

when it is detected N1 consecutive times that beam quality is poor, determining that a beam associated with the frequency resource group fails; or when it is detected in the first phase time window W1 that, a signal quality parameter of the downlink signal on the frequency resource group is less than a preset threshold, determining that a beam associated with the frequency resource group fails; or when it is detected N1 consecutive times in the first phase time window W1 that, beam quality is poor, determining that a beam associated with the frequency resource group fails; or when it is detected N1 consecutive times that, a signal quality parameter of the downlink signal on the frequency resource group is less than a preset threshold in the first phase time window W1, determining that a beam associated with the frequency resource group fails.

A downlink signal is configured for each frequency resource in the frequency resource group. The terminal device monitors a beam by monitoring all downlink signals corresponding to the frequency resource group, and the downlink signal includes a CSI-RS or an SS block. A physical layer of the terminal device measures the signal quality parameter of the downlink signal, and when the signal quality parameter is less than a first threshold, determines that the beam quality is poor, or when the signal quality parameter is greater than a second threshold, determines that the beam quality is good. That a beam associated with the frequency resource group fails indicates one or more beams in the frequency resource group fail.

In a possible design, that a beam associated with the frequency resource group fails is specifically that beams that have a QCL relationship in beams associated with the frequency resource group fail.

In a possible design, the configuration information further includes at least one of a second phase count value N2 and a second phase time window W2 of the frequency resource group.

In a possible design, the method further includes:

when it is detected N2 consecutive times that the beam quality is good, determining that the beam associated with the frequency resource group is successfully recovered; or when it is detected in the second phase time window W2 that the signal quality parameter of the downlink signal on the frequency resource group is greater than the preset threshold, determining that the beam associated with the frequency resource group is successfully recovered; or when it is detected N2 times in the second phase time window W2 that the beam quality is good, determining that the beam associated with the frequency resource group is successfully recovered; or when it is detected N2 consecutive times that, the signal quality parameter of the downlink signal on the frequency resource group is greater than the preset threshold in the second phase time window W2, determining that the beam associated with the frequency resource group is successfully recovered; or when a beam recovery response is received from the network device, determining, by the terminal device, that the beam associated with the frequency resource group is successfully recovered, where the beam recovery response carries beam indication information.

In a possible design, the configuration information further includes: timing duration T1 associated with the frequency resource group; and the method further includes: when the beam associated with the frequency resource group fails, starting a timing operation of the timing duration T1; when the beam associated with the frequency resource group is successfully recovered, stopping the timing operation of the timing duration T1; and when the timing operation expires, determining that the beam associated with the frequency resource group fails to be recovered.

In a possible design, the configuration information includes: at least one of a first phase count value N1 and a time window W1 of a reference frequency resource and an identifier of the reference frequency resource, the reference frequency resource is located in any one of the at least one frequency resource group, and the monitoring, by the terminal device, the downlink signal specifically includes:

when it is detected N1 consecutive times that the beam quality is poor on the reference frequency resource, determining that the beam associated with the reference frequency resource fails; or when it is detected in the first phase time window W1 that, the signal quality parameter of a downlink signal on the reference frequency resource is less than the preset threshold, determining that the beam associated with the reference frequency resource fails; or when it is detected N1 consecutive times in the first phase time window W1 that the beam quality is poor on the reference frequency resource, determining that the beam associated with the reference frequency resource fails; or when it is detected N1 consecutive times that, the signal quality parameter of a downlink signal on the reference frequency resource is less than the preset threshold in the first phase time window W1, determining that the beam associated with the reference frequency resource fails.

In a possible design, the configuration information further includes: at least one of the second phase count value N2 and the second phase time window W2 of the reference frequency resource.

In a possible design, the method further includes:

when it is detected N2 consecutive times that the beam quality is good on the reference frequency resource, determining that the beam associated with the reference frequency resource is successfully recovered; or when it is detected in the second phase time window W2 that the signal quality parameter of the downlink signal on the reference frequency resource is greater than the preset threshold, determining that the beam associated with the reference frequency resource is successfully recovered; or when it is detected N2 times in the second phase time window W2 that the beam quality is good on the reference frequency resource, determining that the beam associated with the reference frequency resource is successfully recovered; or when it is detected N2 consecutive times that, the signal quality parameter of the downlink signal on the frequency resource group is greater than the preset threshold in the second phase time window W2, determining that the beam associated with the reference frequency resource is successfully recovered; or when the beam recovery response is received from the network device, determining, by the terminal device, that the beam associated with the reference frequency resource is successfully recovered, where the beam recovery response carries the beam indication information.

In a possible design, the configuration information further includes: timing duration T1 associated with the reference frequency resource; and the method further includes: when the beam associated with the reference frequency resource fails, starting a timing operation of the timing duration T1; when the beam associated with the reference frequency resource is successfully recovered, stopping the timing operation of the timing duration T1; and when the timing operation expires, determining that the beam associated with the reference frequency resource fails to be recovered.

In a possible design, the configuration information further includes: at least one of a first phase count value and a first phase time window of each frequency resource in the frequency resource group, and at least one of a second phase count value and a second phase time window of each frequency resource in the frequency resource group.

In a possible design, the configuration information further includes timing duration of each frequency resource in the frequency resource group.

In a possible design, the configuration information further includes:

the identifier of the frequency resource group, the identifier of the reference frequency resource in the frequency resource group, the identifier of each frequency resource in the frequency resource group, the mapping relationship between a frequency resource in the frequency resource group and a beam, and the beam indication information of at least one beam associated with each frequency resource in the frequency resource group, where the beam indication information includes at least one of a beam number and a downlink signal resource number.

In a possible design, the configuration information further includes: at least one of an antenna port number, a time-frequency resource location, and a period of a downlink signal on each frequency resource in the frequency resource group.

In a possible design, the configuration information further includes: QCL information of the beams that have a QCL relationship in the beams associated with the frequency resource group and QCL identifiers of the beams that have a QCL relationship in the beams associated with the frequency resource group.

According to a third aspect, this application provides a communication method, including: receiving configuration information of at least one frequency resource group, and receiving, by using at least one beam, a downlink signal on a corresponding frequency resource in the at least one frequency resource group, where each frequency resource group includes at least two frequency resources, and the configuration information includes an identifier of each frequency resource group and an identifier of each frequency resource; and when it is detected based on the downlink signal that a beam associated with a first frequency resource in the frequency resource group fails, sending a beam recovery request on a second frequency resource in the frequency resource group, where the frequency resource group is any one of the at least one frequency resource group.

In a possible design, the configuration information includes: an association relationship between a beam in the frequency resource group and transmission resources corresponding to a plurality of frequency resources, where the transmission resource is a resource that is on a frequency resource and that is used to send the beam recovery request.

The association relationship may be prestored or preconfigured without indication by using the configuration information.

In a possible design, the sending a beam recovery request on a second frequency resource in the frequency resource group is specifically:

sending the beam recovery request on a transmission resource associated with a downlink signal on the first or second frequency resource.

In a possible design, the association relationship includes: an association relationship between the transmission resource and at least one of the following information: an identifier of the downlink signal, an identifier of a downlink signal group, the identifier of the frequency resource, the identifier of the frequency resource group, an identifier of an antenna port, and an identifier of an antenna port group.

In a possible design, the association relationship is specifically:

in a case of k=0, 1, 2, or 3, $r_n=2k+(0 \text{ or/and } 1)+n$;

in a case of k=4, 5, 6, or 7, $r_n=k+4+n$; where k is an index of a downlink signal on a frequency resource, n is an index of the frequency resource, and $r_n$ is an index of a transmission resource on the frequency resource.

In a possible design, the downlink signal is either a CSI-RS or a synchronization signal block (SS block).

According to another aspect, a communications apparatus is provided. The apparatus has a function of implementing behavior of the network device in the foregoing method. The function may be implemented by hardware, or may be implemented by hardware executing corresponding software. The hardware or the software includes one or more modules corresponding to the foregoing function. For example, the network device may be a chip (such as a baseband chip or a communications chip) or a sending device (such as a network device, or a baseband processing board). The foregoing method may be implemented by using software or hardware, or by hardware executing corresponding software.

In a possible design, the apparatus includes: a processing unit and a sending unit. The processing unit is configured to configure at least one frequency resource group, where each frequency resource group includes at least two frequency resources, and each frequency resource is associated with at least one beam. The sending unit is configured to send configuration information of the at least one frequency resource group to a terminal device, where the configuration information includes indication information indicating that the frequency resources in each frequency resource group have a quasi co-location QCL relationship. The sending unit is further configured to send, by using at least one beam, a downlink signal on a corresponding frequency resource in the at least one frequency resource group.

For specific content of the configuration information, refer to the implementation method in the first aspect. Details are not described herein again.

According to still another aspect, the apparatus includes: a transceiver, a memory, and a processor, where the memory stores a set of program code, and the processor is configured to invoke the program code stored in the memory, to perform the following operation:

configuring at least one frequency resource group, where each frequency resource group includes at least two frequency resources, and each frequency resource is associated with at least one beam.

The transceiver is configured to send configuration information of the at least one frequency resource group to a terminal device, where the configuration information includes information indicating that the frequency resources in each frequency resource group have a quasi co-location QCL relationship.

The transceiver is further configured to send, by using the at least one beam, a downlink signal on a corresponding frequency resource in the at least one frequency resource group.

For specific content of the configuration information, refer to the implementation method in the first aspect. Details are not described herein again.

According to yet another aspect, a communications apparatus is provided. The apparatus has a function of implementing behavior of the terminal device in the foregoing method. The function may be implemented by hardware, or may be implemented by hardware executing corresponding software. The hardware or the software includes one or more modules corresponding to the foregoing function. For example, the terminal device may be a chip (such as a baseband chip or a communications chip) or a sending device (such as a network device, or a baseband processing board). The foregoing method may be implemented by using software or hardware, or by hardware executing corresponding software.

In a possible design, the apparatus includes: a receiving unit and a processing unit. The receiving unit is configured to: receive configuration information of at least one frequency resource group from a network device, and receive, by using at least one beam, a downlink signal on a corresponding frequency resource in the at least one frequency resource group, where each frequency resource group includes at least two frequency resources, and the configuration information indicates that the frequency resources in each frequency resource group have a quasi co-location QCL relationship. The processing unit is configured to monitor the downlink signal.

For specific implementations of the receiving unit and the processing unit, refer to the implementation in the second aspect. Details are not described herein again.

According to still yet another aspect, the apparatus includes: a transceiver, a memory, and a processor, where the transceiver is configured to: receive configuration information of at least one frequency resource group from a network device, and receive, by using at least one beam, a downlink signal on a corresponding frequency resource in the at least one frequency resource group, where each frequency resource group includes at least two frequency resources, and the configuration information indicates that the frequency resources in each frequency resource group have a quasi co-location QCL relationship.

The memory stores a set of program code, and the processor is configured to invoke the program code stored in the memory, to perform the following operation:

monitoring the downlink signal.

According to a further aspect, a communications apparatus is provided. The apparatus has a function of implementing behavior of the terminal device in the foregoing method. The function may be implemented by hardware, or may be implemented by hardware executing corresponding software. The hardware or the software includes one or more modules corresponding to the foregoing function. For example, the terminal device may be a chip (such as a baseband chip or a communications chip) or a sending device (such as a network device, or a baseband processing board). The foregoing method may be implemented by using software or hardware, or by hardware executing corresponding software.

In a possible design, the apparatus includes: a receiving unit, a processing unit, and a sending unit. The receiving unit is configured to: receive configuration information of at least one frequency resource group, and receive, by using at least one beam, a downlink signal on a corresponding frequency resource in the at least one frequency resource group, where each frequency resource group includes at least two frequency resources, each frequency resource corresponds to at least one beam, and the configuration information includes an identifier of each frequency resource group and an identifier of each frequency resource. The processing unit is configured to: when it is detected based on the downlink signal that a beam associated with a first frequency resource in the frequency resource group fails, instruct the sending unit to send a beam recovery request on a second frequency resource in the frequency resource group.

For specific implementations of the receiving unit, the processing unit, and the sending unit, refer to the implementation in the third aspect. Details are not described herein again.

According to a still further aspect, the apparatus includes: a transceiver, a memory, and a processor, where the transceiver is configured to: receive configuration information of at least one frequency resource group, and receive, by using at least one beam, a downlink signal on a corresponding frequency resource in the at least one frequency resource group, where each frequency resource group includes at least two frequency resources, each frequency resource corresponds to at least one beam, and the configuration information includes an identifier of each frequency resource group and an identifier of each frequency resource.

The memory stores a set of program code, and the processor is configured to invoke the program code stored in the memory, to perform the following operation:

when it is detected based on the downlink signal that a beam associated with a first frequency resource in the frequency resource group fails, sending a beam recovery request on a second frequency resource in the frequency resource group.

Based on a same invention concept, for a problem-resolving principle and beneficial effects of the apparatus, refer to the foregoing possible method implementations of the terminal device and the brought beneficial effects. Therefore, for implementation of the apparatus, refer to the implementation of the method. Repeated parts are not described again.

According to a yet further aspect of this application, a computer-readable storage medium is provided, where the computer-readable storage medium stores an instruction, and when the instruction is run on a computer, the computer is enabled to perform the methods according to the foregoing aspects.

According to a still yet further aspect of this application, a computer program product including an instruction is provided, and when the computer program product is run on a computer, the computer is enabled to perform the methods according to the foregoing aspects.

BRIEF DESCRIPTION OF DRAWINGS

To describe the technical solutions in the embodiments of the present invention or in the background more clearly, the following briefly describes the accompanying drawings required for the embodiments of the present invention or the BACKGROUND.

DESCRIPTION OF EMBODIMENTS

The following describes the embodiments of the present invention with reference to the accompanying drawings in the embodiments of the present invention.

Figure 1A:
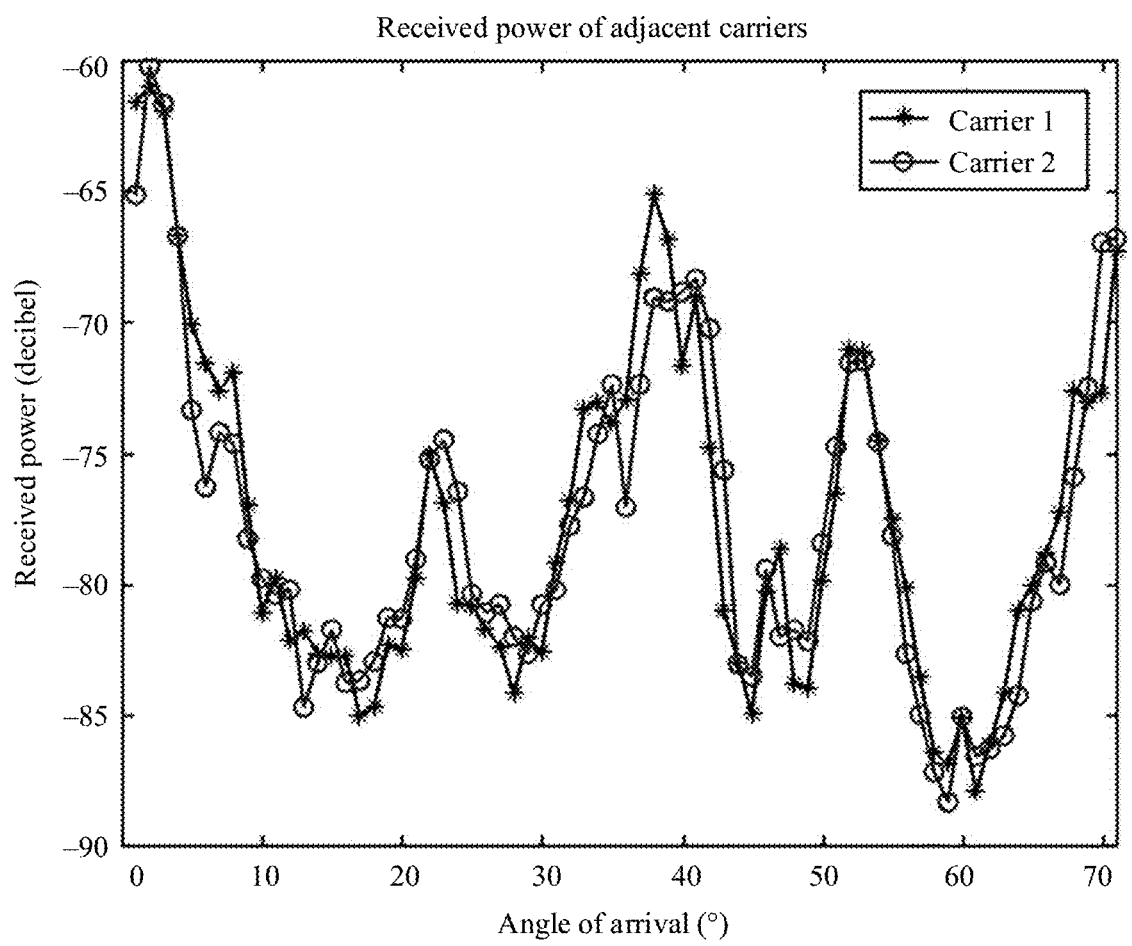
FIG. 1a is a schematic diagram of distribution of received power with respect to angles of arrival.
Figure 1B:
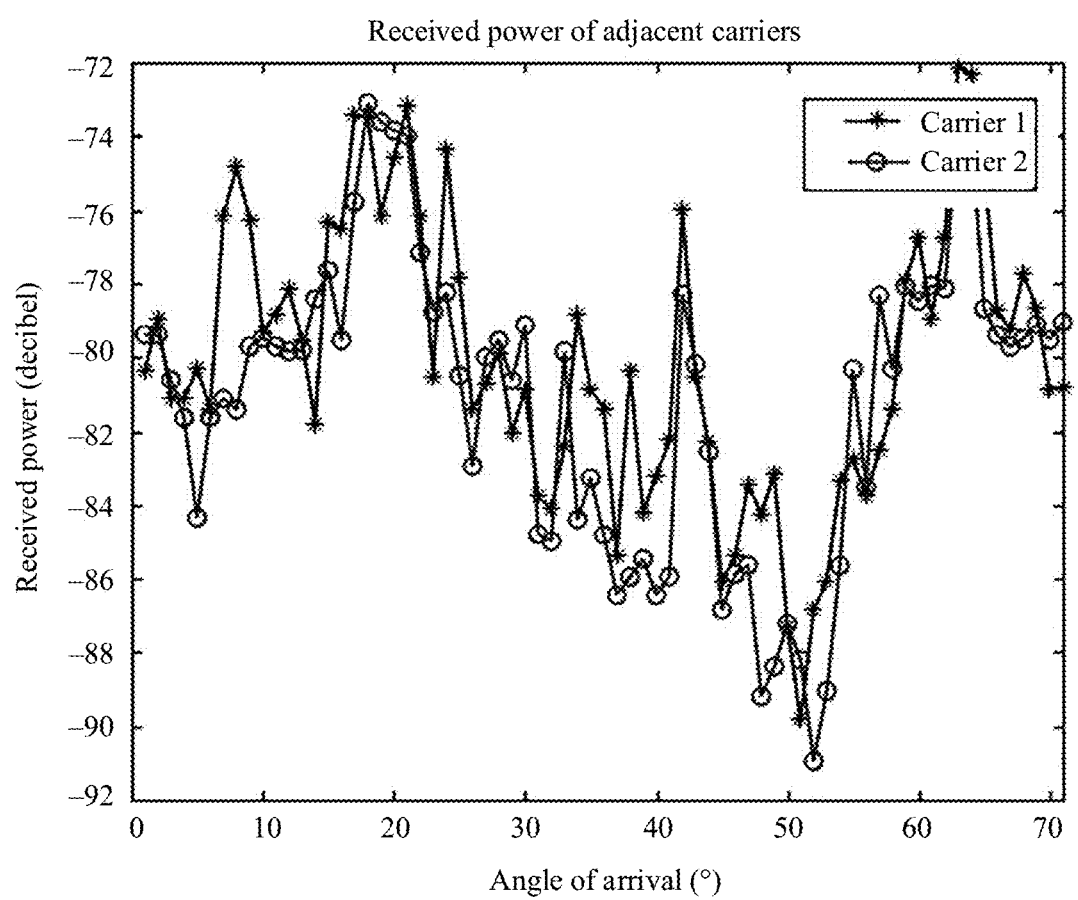
FIG. 1b is another schematic diagram of distribution of received power with respect to angles of arrival.
Figure 2:
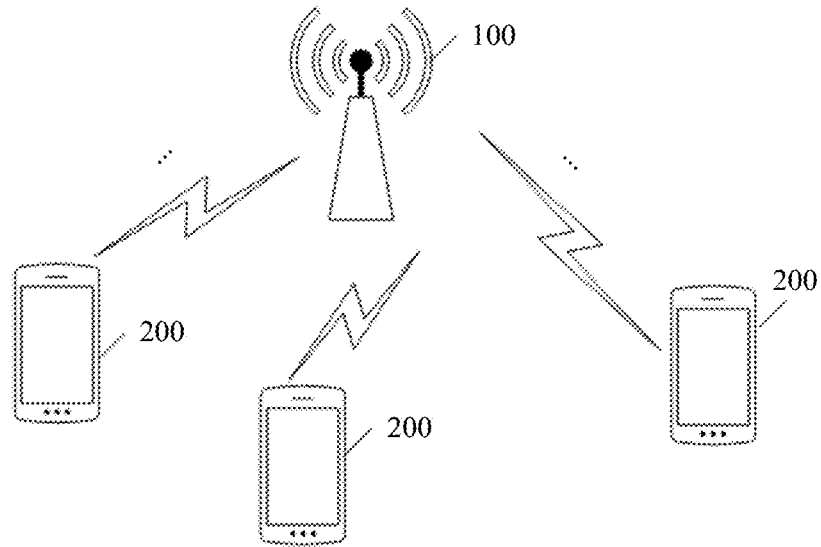
FIG. 2 is a schematic diagram of a communications system according to an embodiment of the present invention.

FIG. 2 is a schematic diagram of a communications system. The communications system may include at least one network device 100 (only one is shown) and one or more terminal devices 200 connected to the network device 100.

The network device 100 may be a device that can communicate with the terminal device 200. The network device 100 may be any device having a wireless transceiver function, and includes but is not limited to a base station (for example, a NodeB, an evolved NodeB, a base station in a fifth generation (5G) communications system, a base station or a network device in a future communications system, an access node, a wireless relay node, or a wireless backhaul node in a Wi-Fi system), or the like. The network device 100 may alternatively be a radio controller in a cloud radio access network (CRAN) scenario. The network device 100 may alternatively be a network device in a 5G network or a network device in a future evolved network, a wearable device, a vehicle-mounted device, or the like. The network device 100 may alternatively be a small cell, a transmission reception point (TRP), or the like. Certainly, this application is not limited to the specific types of devices noted herein.

The terminal device 200 is a device that has a wireless transceiver function, and may be deployed on land and includes an indoor or outdoor device, a handheld device, a wearable device, a vehicle-mounted device, and may be deployed on a water surface (for example, a ship), or may be deployed in the air (for example, an airplane, a balloon, or a satellite). The terminal device may be a mobile phone, a tablet computer, a computer with a wireless transceiver function, a virtual reality (VR) terminal device, an augmented reality (AR) terminal device, a wireless terminal use in industrial control, a wireless terminal in an autonomous vehicle, a wireless terminal in a remote medical application, a wireless terminal in a smart grid environment, a wireless terminal used in transportation safety, a wireless terminal in a smart city environment, a wireless terminal in a smart home environment, or the like. An application scenario is not limited in the embodiments of this application. The terminal device may sometimes be referred to as user equipment (UE), an access terminal device, a UE unit, a UE station, a mobile station, a remote station, a remote terminal device, a mobile device, a UE terminal device, a terminal device, a wireless communications device, a UE agent, a UE apparatus, or the like.

It should be noted that the terms "system" and "network" in the embodiments of the present invention may be used interchangeably. "A plurality of" means two or more than two. In view of this, in the embodiments of the present invention, "a plurality of" may also be understood as "at least two". The term "and/or" describes an association relationship between associated objects and indicates that three relationships may exist. For example, A and/or B may indicate the following three cases: Only A exists, both A and B exist, and only B exists. In addition, the character "/" generally indicates an "or" relationship between the associated objects unless otherwise specified.

Figure 3:
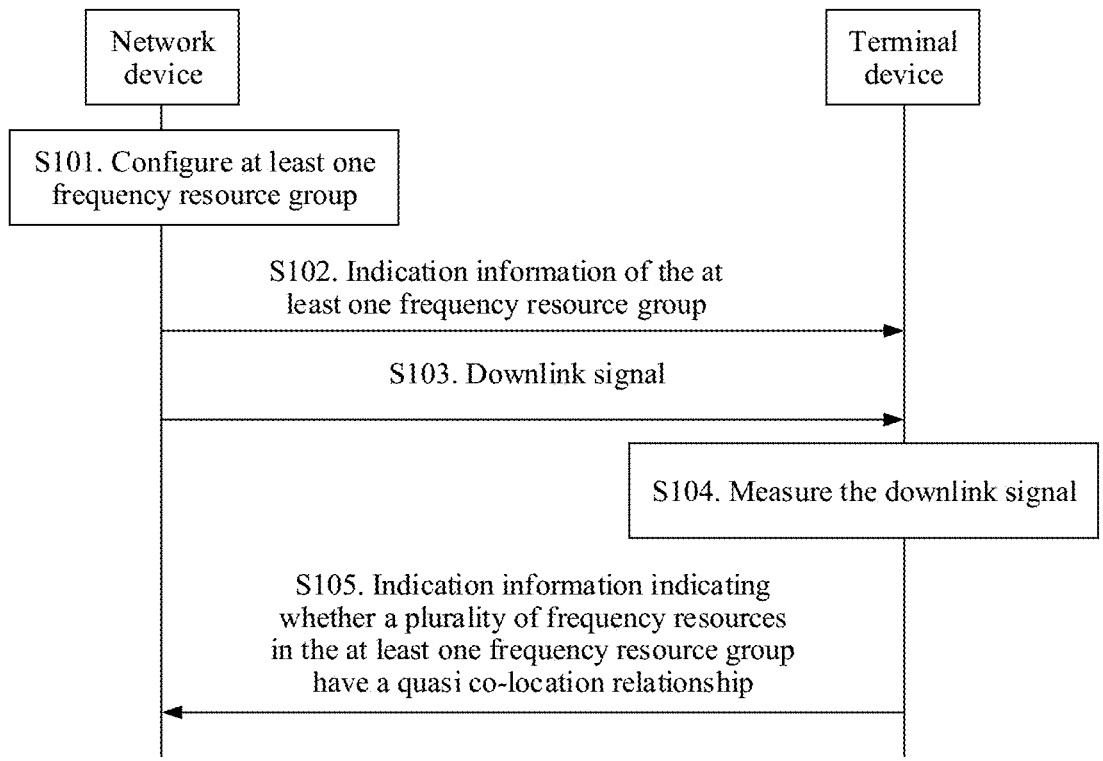
FIG. 3 is a schematic flowchart of a communication method according to an embodiment of the present invention.

FIG. 3 is a schematic flowchart of a communication method according to an embodiment of the present invention. The method may include the following steps:

S101. A network device configures at least one frequency resource group, where each frequency resource group includes one or more frequency resources.

S102. The network device sends indication information of the at least one frequency resource group to a terminal device. The terminal device receives the indication information of the at least one frequency resource group from the network device.

S103. The network device sends, by using at least one beam, a downlink signal on a corresponding frequency resource in the at least one frequency resource group. The terminal device receives the downlink signal from the network device by using at least one beam, where the downlink signal is sent on the corresponding frequency resource in the at least one frequency resource group.

S104. The terminal device measures the downlink signal.

S105. The terminal device reports indication information indicating whether a plurality of frequency resources in the at least one frequency resource group have a QCL relationship. The network device receives, from the terminal device, the indication information indicating whether the plurality of frequency resources in the at least one frequency resource group have a QCL relationship.

The communications apparatus in this application may include a first communications apparatus and a second communications apparatus, or may have more communications apparatuses. As shown in FIG. 3, the first communications apparatus herein is a network device, and the second communications apparatus is a terminal device.

In this application, the frequency resource may be a carrier component (CC, referred to as "carrier" for short below) or a bandwidth part (BP). A bandwidth part is a part of bandwidth of a carrier. One carrier may be divided into a plurality of bandwidth parts. The plurality of bandwidth parts form a bandwidth part group. In other words, one carrier may be considered as one or more bandwidth part groups.

A QCL relationship in this application means that antenna ports have a QCL relationship.

That antenna ports have a QCL relationship may specifically include the following: Carrier components have a QCL relationship, beams have a QCL relationship, bandwidth parts have a QCL relationship, and the like.

That one carrier has a QCL relationship with another carrier means that an antenna port on which the one carrier is sent has a QCL relationship with an antenna port on which the another carrier is sent.

That one bandwidth part has a QCL relationship with another bandwidth part means that an antenna port on which the one bandwidth part is sent has a QCL relationship with an antenna port on which the another bandwidth part is sent.

That one beam has a QCL relationship with another beam means that, for example, an antenna port on which one downlink signal is sent has a QCL relationship with an antenna port on which another downlink signal is sent. In a scenario of this example, an identifier of the downlink signal and an identifier of the antenna port are used to indicate beam information. For example, a CSI-RS resource #1 is used to indicate a beam 1, and a CSI-RS resource #2 is used to indicate a beam 2. That the beam 1 has a QCL relationship with the beam 2 essentially means that an antenna port on which the CSI-RS resource #1 is sent has a QCL relationship with an antenna port on which the CSI-RS resource #2 is sent.

In this specification, if the phrase "having a QCL relationship" is used, it may indicate that carriers have a QCL relationship, that bandwidth parts have a QCL relationship, and that beams have a QCL relationship. Alternatively, one of the cases is indicated. To be specific, carriers have a QCL relationship, or bandwidth parts have a QCL relationship, or beams have a QCL relationship.

The network device may first configure at least one frequency resource group by using a frequency resource aggregation technology, and assume that a plurality of frequency resources in the frequency resource group have a QCL relationship. The network device may configure the frequency resource group by itself. For example, if the network device assumes that frequency resources with a relatively small frequency difference may always have a QCL relationship, the network device configures a plurality of frequency resources with a relatively small frequency difference as one frequency resource group.

Descriptions in the following embodiments are all based on an assumption of a QCL relationship made by a network device. In another alternative implementation of S101 and S102, the network device may not preconfigure a frequency resource group that has an assumed QCL relationship, but a terminal device configures a frequency resource group, determines, based on measurement on a downlink signal, whether the assumption of the frequency resource group is true, and then reports indication information of the configured frequency resource group to the network device. In this case, it is determined that a plurality of frequency resources in the configured frequency resource group have a QCL relationship. In another alternative implementation of S101 and S102, the network device and the terminal device may not perform an action of configuring a frequency resource group, but use a default negotiated frequency resource group.

Optionally, in an implementation, before S101, the method may further include the following steps: sending, by the terminal device, information about one or more frequency resources supported by the terminal device to the network device; and obtaining, by the network device, the information about the one or more frequency resources supported by the terminal device. In other words, the terminal device reports a frequency resource aggregation capability. For example, the terminal device reports that the terminal device can support {frequency resource 1, frequency resource 2, frequency resource 7, frequency resource 8, frequency resource 9}. In another implementation, the network device may alternatively consider, by default, frequency resources supported by the terminal device. Subsequently, if the terminal device does not support some frequency resources in the frequency resource group obtained through division by the network device, the terminal device may not measure a downlink signal sent on these frequency resources.

After configuring the frequency resource group, the network device sends indication information of the frequency resource group to the terminal device. Specifically, indication information of the at least one frequency resource group specifically includes at least one of the following information: an identifier of the at least one frequency resource group and an identifier of one or more frequency resources included in each frequency resource group.

For example, a plurality of CCs are divided into two CC groups: CCG 1 {CC 1, CC 2}, and CCG 2 {CC 3, CC 5, CC 6}. The network device sends indication information of the two CC groups to the terminal device, where the indication information of the CC groups indicates that CCG 1 includes the CC 1 and the CC 2, and that CCG 2 includes the CC 3, the CC 5 and the CC 6.

Figure 4:
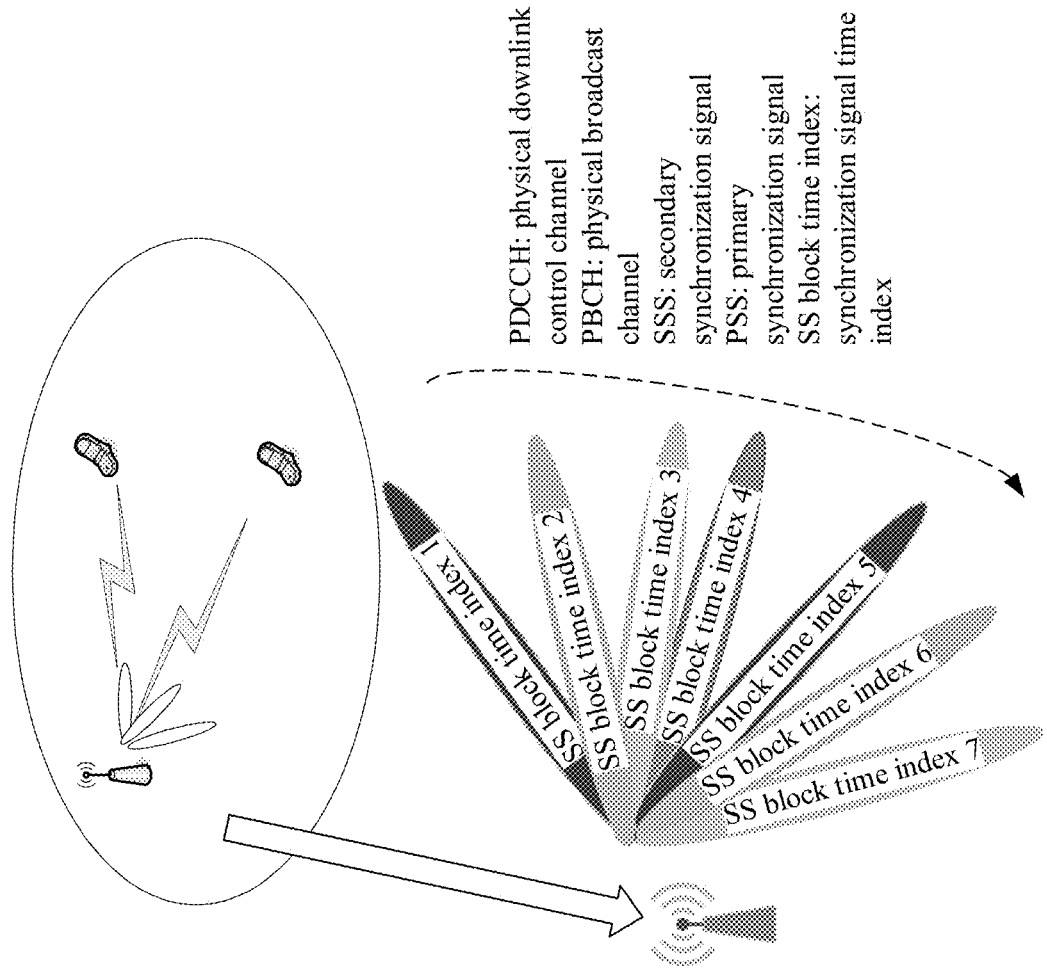
FIG. 4 is a schematic diagram of an example synchronization signal structure and sending manner.
Figure 4:
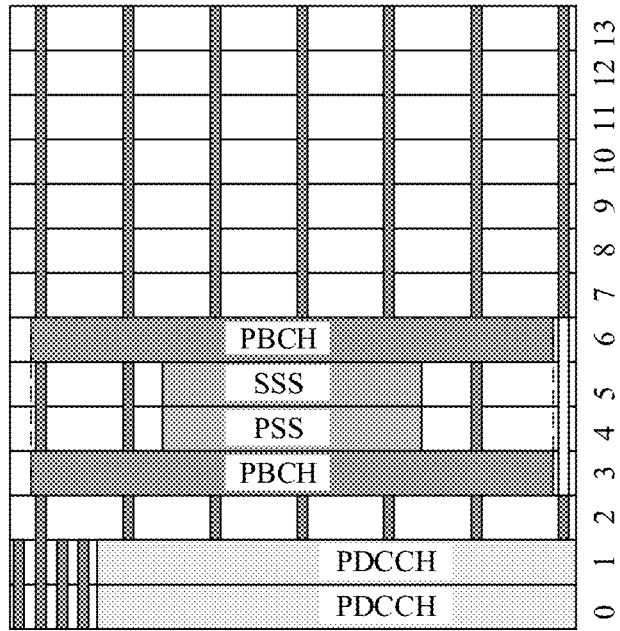

After configuring the frequency resource group and sending the indication information of the frequency resource group to the terminal device, the network device sends, by using at least one beam, a downlink signal on a corresponding frequency resource in the at least one configured frequency resource group. The downlink signal may be a synchronization signal block (SS block), or a channel state information-reference signal (CSI-RS). The synchronization signal includes a primary synchronization signal (PSS) and a secondary synchronization signal (SSS). FIG. 4 is a schematic diagram of a synchronization signal structure and a sending manner. The synchronization signal and a physical broadcast channel (PBCH) are sent in a binding manner, and are referred to as an SS block. For example, the SS block may support a maximum of 64 beam directions, which are distinguished by synchronization signal time indexes (SS block time index). In other words, different SS block time indexes indicate different beams. For example, the SS block may be periodically sent at regular intervals of {20, 40, 80, 160} milliseconds, and all beam directions need to be traversed within one period.

After receiving, by using at least one receive beam, the downlink signal sent by the network device, the terminal device measures the downlink signal. Step S104 further specifically includes the following step: measuring, by the terminal device, at least one of the following information of the downlink signal: beam indication information, quality information of the downlink signal associated with the one or more frequency resources, or a large-scale channel property of an antenna port. Beam directions of the at least one receive beam are all the same or partially the same.

The beam indication information may be represented by at least one of the following: an absolute index of a beam, a relative index of the beam, a logical index of the beam, an index of an antenna port corresponding to the beam, an index of an antenna port group corresponding to the beam, an index of a downlink signal corresponding to the beam, a time index of a downlink synchronization signal block, beam pair link (BPL) information, a transmit parameter (Tx parameter) corresponding to the beam, a receive parameter (Rx parameter) corresponding to the beam, a transmit weight corresponding to the beam, a weight matrix, a weight vector, a receive weight corresponding to the beam, or indexes of the beam pair link information, the transmit parameter corresponding to the beam, the receive parameter corresponding to the beam, the transmit weight corresponding to the beam, the weight matrix, the weight vector, and the receive weight corresponding to the beam, a transmit codebook (codebook) corresponding to the beam, a receive codebook corresponding to the beam, or indexes of the transmit codebook corresponding to the beam and the receive codebook corresponding to the beam.

Measuring the beam indication information described herein specifically refers to that some beam identifiers are obtained through measurement, and some beam identifiers are obtained in another manner. For example, for the time index (represented by six bits) of the downlink synchronization signal block, three bits are carried on a physical broadcast channel (PBCH), and the other three bits may be represented by a mask of a demodulation reference signal (DMRS) on the PBCH. For the terminal device, three bits are obtained by measuring the DMRS on the PBCH, and the other three bits are obtained by decoding the PBCH.

The quality information of the downlink signal includes one or more of a signal-to-noise ratio (SNR)/signal to interference plus noise ratio (SINR), downlink signal received power (RSRP), downlink signal received quality (RSRQ), a received signal strength indicator (RSSI), or channel quality information (channel quality information, CSI).

The terminal device reports indication information indicating whether a plurality of frequency resources in the at least one frequency resource group have a QCL relationship. In an implementation, the indication information indicating whether the plurality of frequency resources in the at least one frequency resource group have a QCL relationship specifically includes at least one of the following information: the identifier of the at least one frequency resource group, the identifier of the one or more frequency resources, the beam indication information, the quality information of the downlink signal associated with the one or more frequency resources, the large-scale channel property of the antenna port, and correlation information of the one or more frequency resources. In this implementation, the network device needs to determine, based on the indication information, whether the plurality of frequency resources in the at least one frequency resource group have a QCL relationship. In another implementation, the indication information may be a specific value. For example, if the indication information is a first value, it indicates that the plurality of frequency resources in the at least one frequency resource group have a QCL relationship. If the indication information is a second value, it indicates that the plurality of frequency resources in the at least one frequency resource group do not have a QCL relationship. In this implementation, the terminal device determines whether the plurality of frequency resources in the at least one frequency resource group have a QCL relationship, and the network device can directly receive the determining result.

The quality information of the downlink signal associated with the frequency resource may be obtained by measuring quality of the downlink signal received on the frequency resource.

The large-scale channel property of the antenna port includes: delay spread, an average delay, Doppler spread, a Doppler frequency shift, an average gain, a receive beam number of the terminal device, transmit/receive channel correlation, an angle of arrival, spatial correlation of a receiver antenna, a dominant angle of arrival (AoA), an average angle of arrival, an AoA spread, and the like.

Three types of QCL relationships are defined based on the large-scale channel property.

Type 1: Average gain QCL. If two antenna ports have a QCL relationship with respect to the average gain, generally, the two antenna ports should be located at a same transmission point. In this way, it can be ensured that path losses experienced by the two antenna ports are the same.

Type 2: Demodulation parameter QCL, that is, QCL with respect to delay spread, Doppler spread, a Doppler frequency shift, and an average delay. If two antenna ports have a QCL relationship with respect to the foregoing four parameters, generally, the two antenna ports should be located on a same antenna panel (panel), or be emitted from a same radio frequency link (RF link). In this way, it can be ensured that the two antenna ports undergo a same moving speed and phase offset.

Type 3: Spatial parameter QCL (spatial QCL), that is, whether beams orient to a same direction. If two antenna ports have a QCL relationship with respect to a receiver-side spatial parameter (Rx spatial QCL), generally, signals transmitted from the two antenna ports can be received by the terminal device by using one receive beam.

The correlation information of the one or more frequency resources may refer to a correlation between the frequency resource and a reference frequency resource in the frequency resource group. If a plurality of frequency resources in the frequency resource group have a high correlation with the reference frequency resource, the plurality of frequency resources have a QCL relationship with the reference frequency resource. Specifically, in a group including a primary frequency resource, the reference frequency resource is the primary frequency resource. In a group excluding a primary frequency resource, the network device may specify a frequency resource as a reference frequency resource in the group.

Specifically, several cases may be considered when the network device sends a downlink signal on a frequency resource by using a beam. According to an actual situation, content of the indication information reported by the terminal device may be different. That the SS block is sent on a plurality of carriers and spatial QCL is determined is used as an example:

In one case, the network device sends an SS block on each carrier in each carrier group.

In addition, a measurement result from the terminal device varies depending on whether directions of beams sent on all the carriers are completely the same, partially the same, or completely different.

Figure 5A:
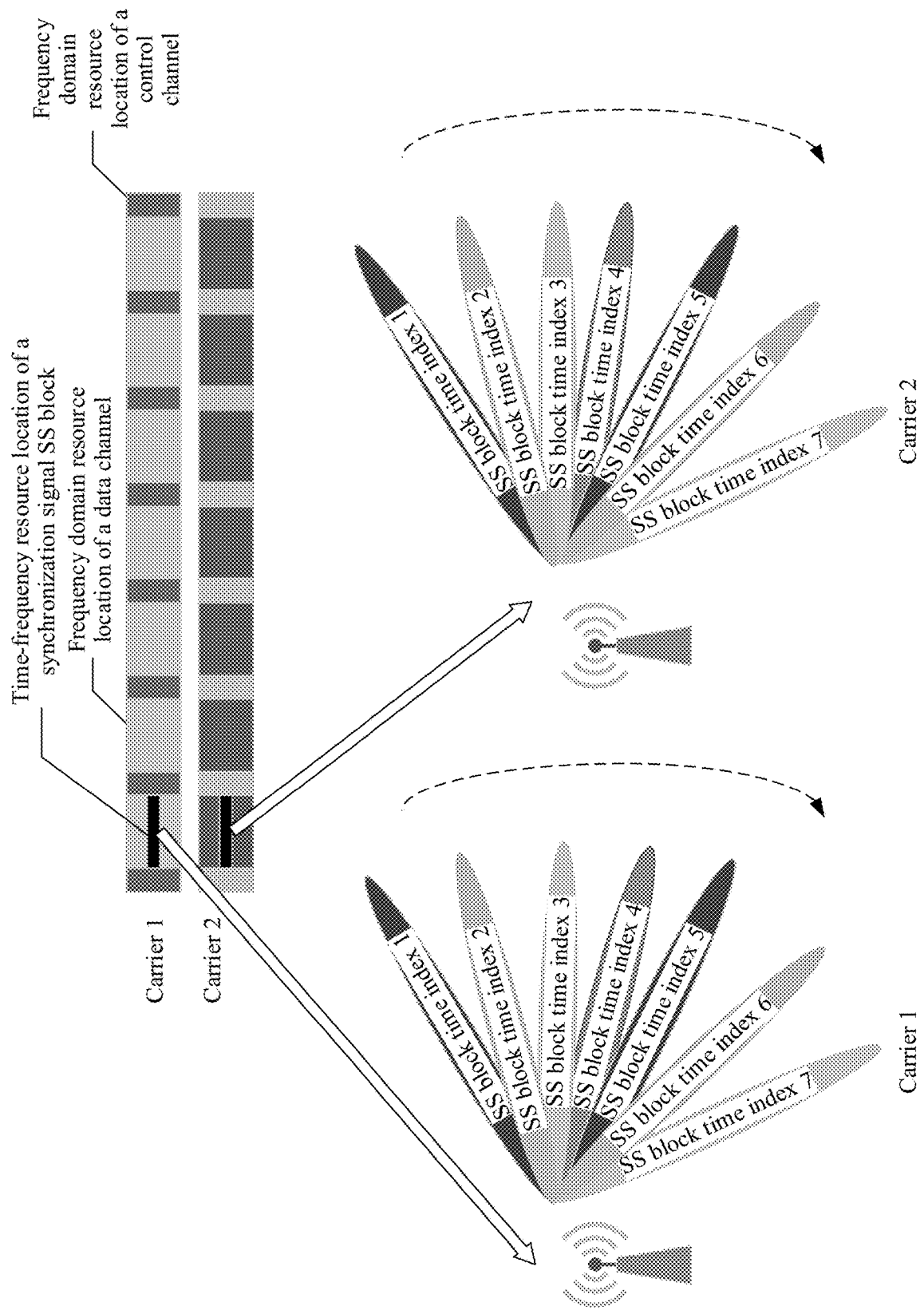
FIG. 5a is an example schematic diagram of sending of an SS block on a plurality of carriers.

FIG. 5a is an example schematic diagram of sending of an SS block on a plurality of carriers. The SS block is sent in a plurality of beam directions on each carrier, and a beam indication (namely, SS block time index) on each carrier corresponds to a same transmit beam direction. Specifically, the network device sends a synchronization signal at a time-frequency resource location of the synchronization signal. The terminal device measures each received SS Block on each carrier. The terminal device may perform measurement and report content in the following several manners.

Manner 1: The terminal device measures the downlink signal and reports related content, and the network device determines, based on the related content reported by the terminal device, whether the carriers have a QCL relationship. For example, {carrier number #1, beam information SS block time index #1, beam quality of 8 dB, spatial parameter AoA of 20 degrees; beam information SS block time index #2, beam quality of 10 dB, spatial parameter AoA of 25 degrees; . . . }; {carrier number #2, beam information SS block time index #1, beam quality of 8 dB, spatial parameter AoA of 20 degrees; beam information SS block time index #2, beam quality of 10 dB, spatial parameter AoA of 25 degrees; . . . }. The network device separately compares beam quality information and the spatial parameters reported by the terminal device on two carriers in respective directions, and may determine that the two carriers have a spatial QCL relationship. If beam quality information or spatial parameters on two carriers in a direction are different, the two carriers may not have a spatial QCL relationship.

Manner 2: The terminal device measures the downlink signal and reports related content, and the network device determines, based on the related content reported by the terminal device, whether the carriers have a QCL relationship. For example, {carrier number #1, beam information SS block time index #1, beam quality of 8 dB, correlation of 80% between a spatial parameter and a primary carrier; beam information SS block time index #2, beam quality of 10 dB, correlation of 100% between a spatial parameter and a primary carrier; . . . }. It is assumed that a reference carrier herein is a primary carrier, the carrier number #1 and the primary carrier are located in one carrier group, and the network device compares a correlation between spatial parameters with the primary carrier on the carrier in respective directions. If the correlation exceeds a specified threshold, it can be determined that the carrier number #1 and the primary carrier have a spatial QCL relationship. For other carriers in the carrier group, whether the other carriers in the carrier group have a QCL relationship may also be determined by comparing correlations between the other carriers and the spatial parameter on the reference carrier.

Manner 3: After measuring the downlink signal, the terminal device determines whether the carriers have a QCL relationship, and sends indication information indicating whether the carriers have a QCL relationship to the network device. For example, {carrier number #1, beam information SS block time index #2, beam quality of 10 dB}; {carrier number #2, beam information SS block time index #2, beam quality of 10 dB}; and {1-bit information indicating that the carriers #1 and #2 have a spatial QCL relationship}. The terminal device determines, based on measurement information, whether the two carriers have a QCL relationship, and then reports indication information indicating whether the two carriers have a QCL relationship to the network device. The indication information is 1-bit information. The network device may learn from the 1-bit information that the two carriers have a spatial QCL relationship.

Manner 4: After measuring the downlink signal, if the terminal device finds that beam information and beam quality of two or more carriers are consistent, the terminal device may report beam information and beam quality of only one carrier group. For example, {carrier number group #1, beam information SS block time index #2, beam quality of 10 dB}. Because the measured beam information and beam quality on two carriers are completely consistent, that is, a QCL relationship exists, the terminal device may report beam information and beam quality of only one of the plurality of carriers, to reduce overheads. The network device may determine, based on a reporting manner, that the two carriers have a spatial QCL relationship. If a QCL relationship does not exist, the network device obtains two different groups of report quantities.

For a frequency resource group including N frequency resources, the terminal device may feed back, in the following several forms, whether each two frequency resources in the frequency resource group have a QCL relationship:

For example, a table form may be used, as shown in Table 1.

TABLE 1

QCL relationship between frequency resources in a frequency resource group

| Whether a QCL relationship exists | Frequency resource 1 | Frequency resource 2 | ... | Frequency resource N |
|---|---|---|---|---|
| Frequency resource 1 | — | 1 | ... | 0 |
| Frequency resource 2 | 1 | — | ... | 1 |
| ... | ... | ... | ... | ... |
| Frequency resource N | 0 | 1 | ... | — |

In Table 1, "1" indicates that two frequency resources have a QCL relationship, "0" indicates that two frequency resources do not have a QCL relationship, and "--" indicates null information. Certainly, on the contrary, "0" may alternatively indicate that two frequency resources have a QCL relationship, and "1" indicates that two frequency resources do not have a QCL relationship. Alternatively, "yes" indicates that two frequency resources have a QCL relationship, and "no" indicates that two frequency resources do not have a QCL relationship.

In addition, it can be determined from Table 1 that a value on one side of a diagonal is the same as the other side, and the terminal device may also report only a value on either side of the diagonal.

For another example, the terminal device may perform feedback by using a bitmap (bitmap). Specifically, for example, for a frequency resource group that has N=4 frequency resources, the first frequency resource in the group is a reference frequency resource. The terminal device uses four bits (1, 1, 0, 0) to indicate that the first frequency resource and the second frequency resource in the group have a QCL relationship with the reference frequency resource, and the third frequency resource and the fourth frequency resource in the group do not have a QCL relationship with the reference frequency resource. Alternatively, the terminal device may use N−1 bits (1, 0, 0) to indicate whether other frequency resources in the group different from the reference frequency resource have a QCL relationship with the reference frequency resource.

Figure 5B:
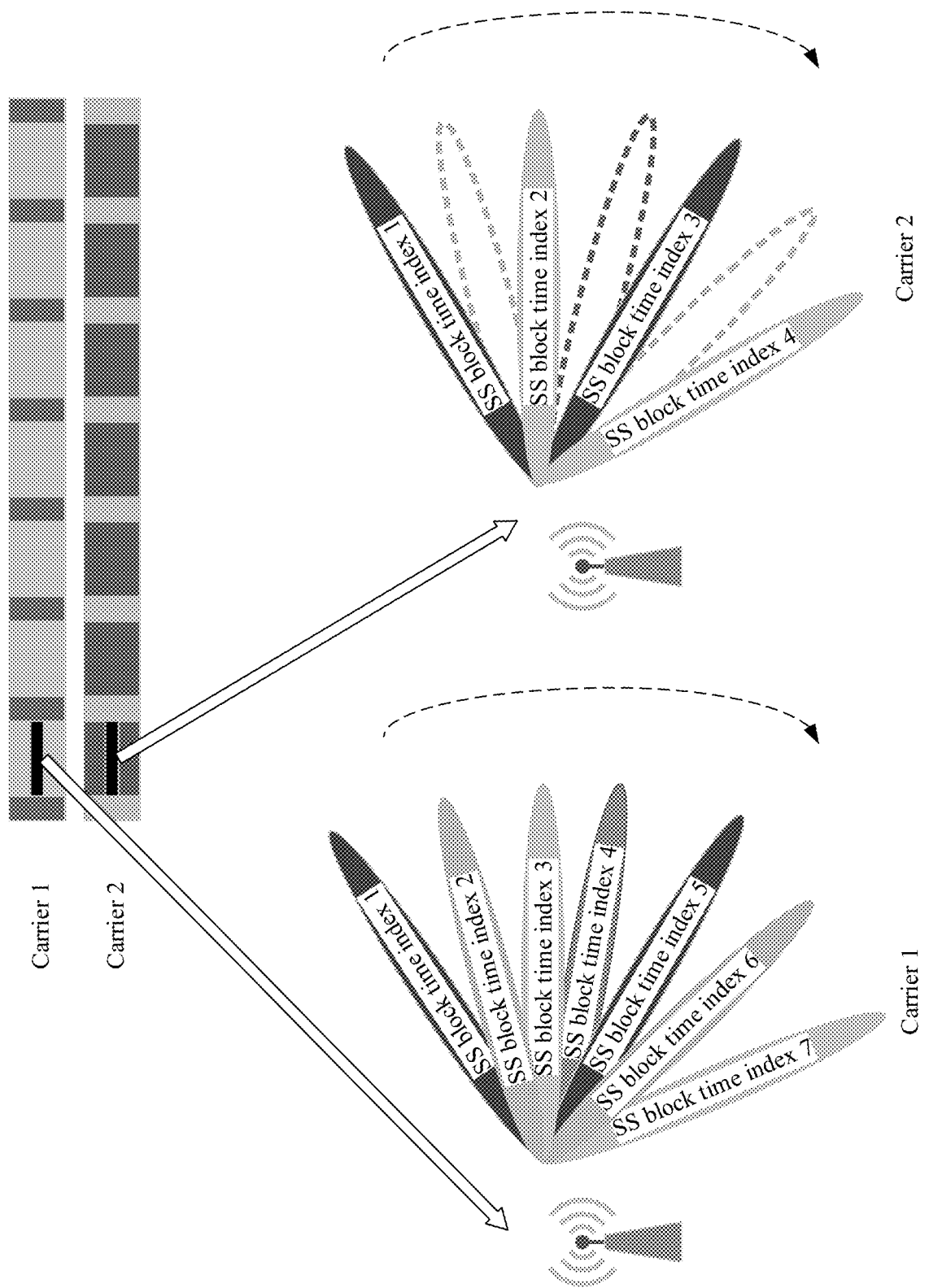
FIG. 5b is another example schematic diagram of sending of an SS block on a plurality of carriers.

FIG. 5b is another example schematic diagram of sending of an SS block on a plurality of carriers. The SS block is sent in a plurality of beam directions on each carrier, and only some of the plurality of beam directions are the same. A beam marked by a dashed line is a beam direction in which a carrier 1 performs sending but a carrier 2 does not perform sending. In this case, for example, a beam direction corresponding to an SS block time index #2 on the carrier 2 is different from a beam direction corresponding to an SS block time index #2 on the carrier 1, and the terminal device needs to perform feedback based on carrier numbers for differentiation. For other reporting content, refer to the foregoing description. The terminal device may determine, through measurement based on received signals on some beams, whether the carriers have a QCL relationship.

Figure 5C:
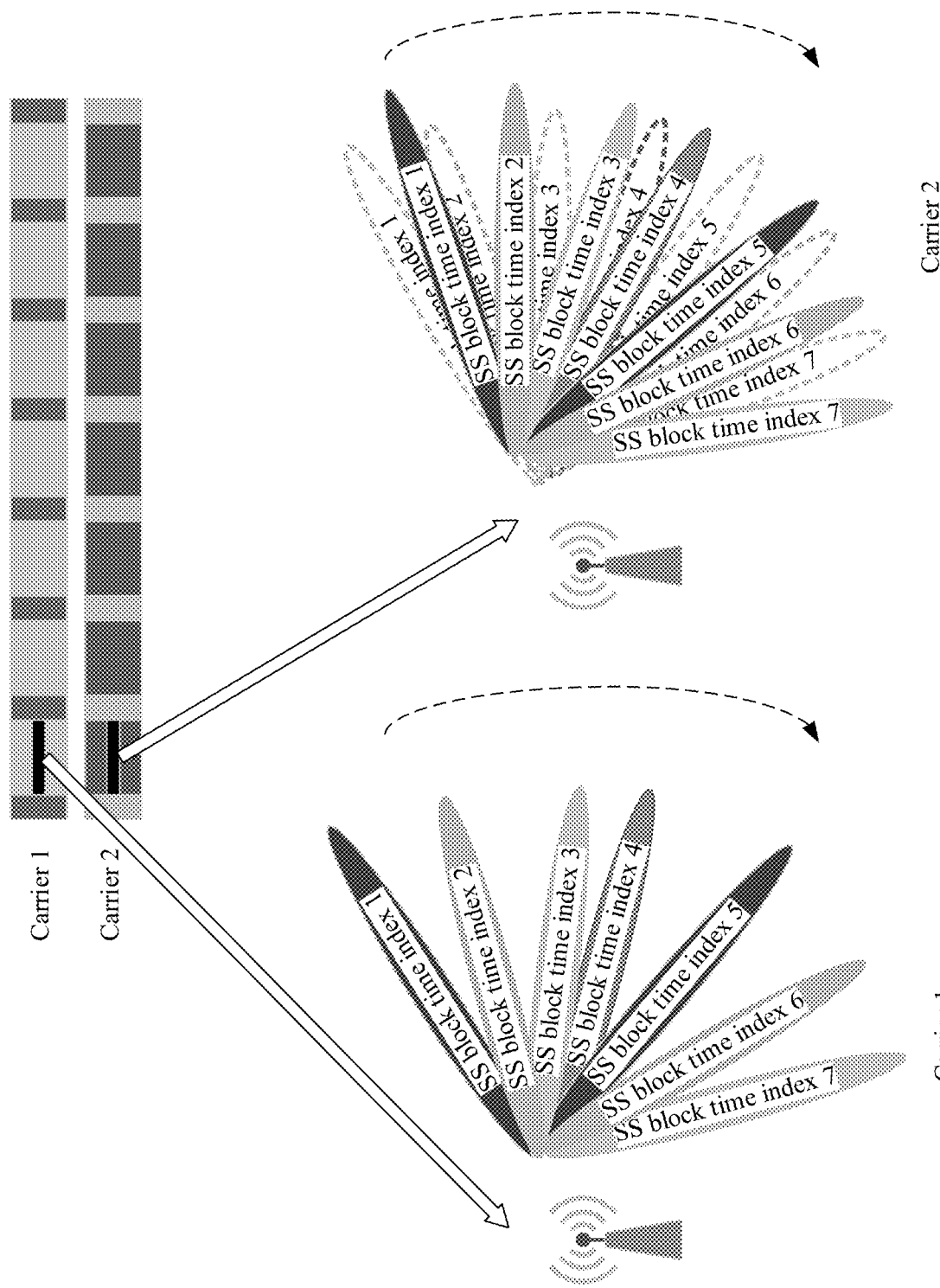
FIG. 5c is still another example schematic diagram of sending of an SS block on a plurality of carriers.

FIG. 5c is still another example schematic diagram of sending of an SS block on a plurality of carriers. The SS block is sent in a plurality of beam directions on each carrier, and all the plurality of beam directions are different. A beam marked by a dashed line is a beam direction in which a carrier 1 performs sending but a carrier 2 does not perform sending. This case indicates that the network device certainly uses different radio frequency links on the two carriers. For example, a beam direction corresponding to an SS block time index #2 on the carrier 2 is different from a beam direction corresponding to an SS block time index #2 on the carrier 1, and the terminal device needs to perform feedback based on carrier numbers for differentiation. Because the network device does not use beams in a same direction when sending a downlink signal, the terminal device cannot determine, based on a measurement result, whether the two carriers have a QCL relationship, or the network device cannot determine, based on content reported by the terminal device, whether the two carriers have a QCL relationship. The terminal device may verify an assumption of the QCL relationship in subsequent beam measurement.

Figure 6:
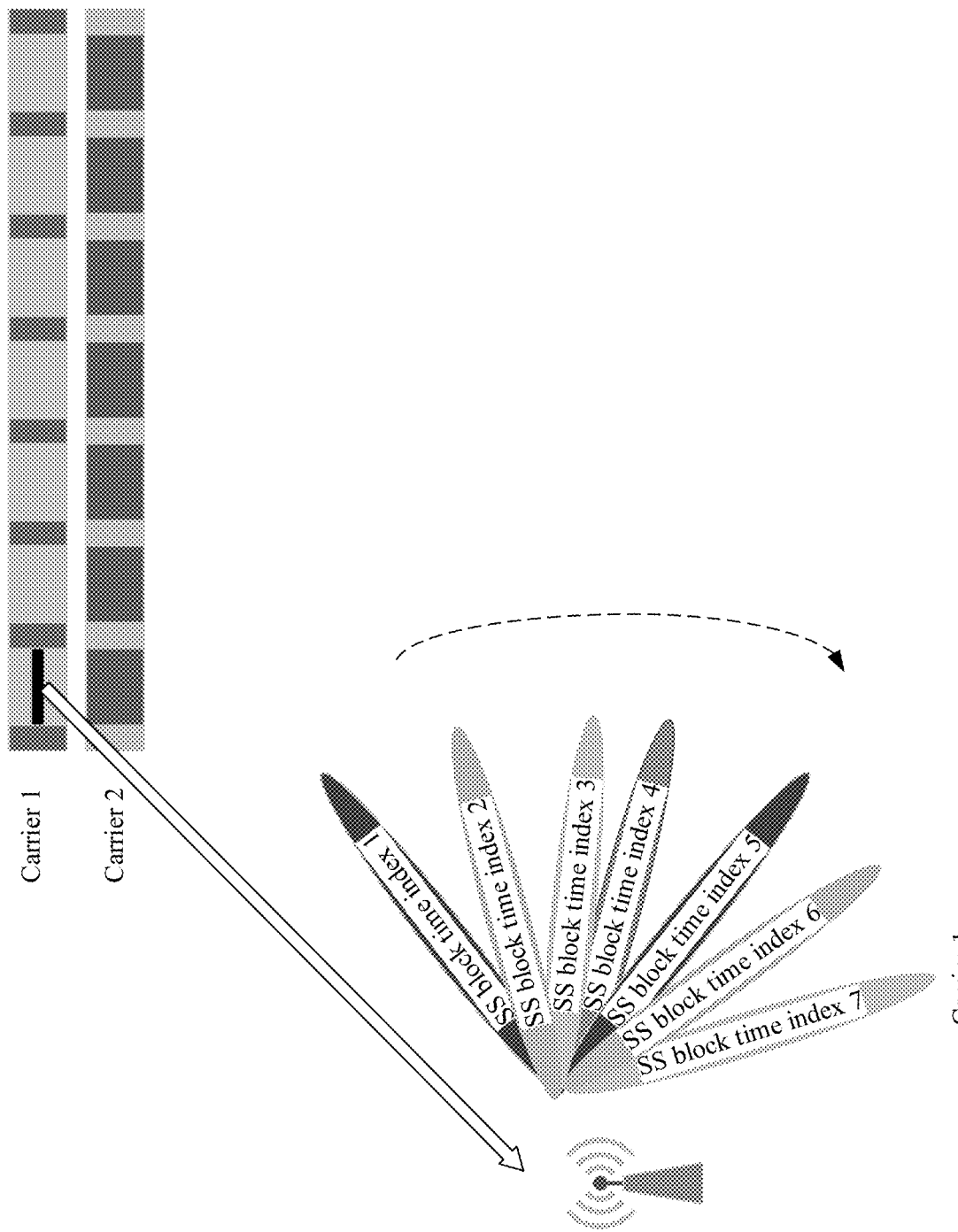
FIG. 6 is yet another example schematic diagram of sending of an SS block on a plurality of carriers.

In another case, the network device sends a downlink signal on one carrier in each carrier group. FIG. 6 is yet another example schematic diagram of sending of a downlink signal on a plurality of carriers. A carrier 1 and a carrier 2 belong to one carrier group. The network device sends an SS block only on the carrier 1, where a transmit beam has a plurality of directions, and different directions are represented by different SS block time indexes. In this case, the terminal device may report only {carrier group number, beam indication information, beam quality}. However, a carrier number, a QCL assumption between different carriers, or a correlation between spatial parameters may not be reported. In this phase, the terminal device can only assume that all carriers in one carrier group have a spatial QCL relationship. The terminal device may determine, in a subsequent phase, whether the spatial QCL relationship exists for all the carriers in the group.

After determining a QCL relationship between frequency resources based on the indication information about the QCL relationship sent by the terminal device, the network device updates a preconfigured frequency resource group, and sends the updated frequency resource group to the terminal device. Therefore, optionally, after step S105, the method may further include the following steps: notifying, by the network device, an updated frequency resource group to the terminal device; and receiving, by the terminal device, the updated frequency resource group notified by the network device. For example, the network device preconfigures a carrier group as: {carrier group #1: carrier 1, carrier 2}; {carrier group #2: carrier 7, carrier 8}. If the terminal device reports feedback that a spatial QCL relationship between the carrier 1 and the carrier 2 exists, and a spatial QCL relationship between the carrier 7 and the carrier 8 does not exist, the network device may reconfigure the carrier group as: {carrier group #1: carrier 1, carrier 2}; {carrier group #2: carrier 7}; {carrier group #3: carrier 8}, and notify information about the updated frequency resource group to the terminal device.

It should be noted that, configuration signaling of the network device and reporting signaling of the terminal device may be sent by using radio resource control (RRC) signaling carried in a data channel, or by using media access control-control element (MAC-CE) signaling or downlink control information (DCI) signaling. The used channel may alternatively be a broadcast channel or a control channel. This is not limited herein.

It can be determined that, specific frequency resource grouping is implemented for each terminal device through information exchange between the network device and the terminal device, so that for one terminal device, frequency resources in each frequency resource group have a QCL relationship, and therefore the network device may serve the terminal device by using the frequency resource group.

Further, because the terminal device may move, and a direction of the receive beam of the terminal device may change, a QCL relationship between frequency resources for the terminal device needs to be maintained and updated.

For example, when the terminal device initially accesses the network device, the network device may send a synchronization signal to determine a QCL relationship between frequency resources for the terminal device. However, during subsequent maintenance and update of the QCL relationship, the network device may send a CSI-RS to update the QCL relationship, and certainly may alternatively send another downlink signal. The synchronization signal is periodically sent, and the CSI-RS may be periodically, aperiodically, or semi-persistently sent.

After the terminal device moves, the frequency resource configured by the network device to serve the terminal device may change, and therefore configuration of the frequency resource group changes accordingly. Therefore, optionally, after step S105, the method may further include the following steps: notifying, by the network device, an updated frequency resource group to the terminal device; and receiving, by the terminal device, the updated frequency resource group notified by the network device. A process of determining, by the terminal device, whether frequency resources included in the updated frequency resource group have a QCL relationship is the same as that in the foregoing embodiment. A difference lies in that the downlink signal received by the terminal device may alternatively be a CSI-RS. Details are not further described herein. Certainly, if the configuration of the frequency resource group does not change, the terminal device may further re-determine whether the frequency resources included in the frequency resource group have a QCL relationship.

If the network device sends a CSI-RS, in the indication information reported by the terminal device, the beam indication information may be a CSI-RS resource number, a CSI-RS resource configuration number, a CSI-RS port number, or a combination of the foregoing several numbers.

In addition, in this embodiment, because beam directions on each frequency resource may be different, the network device further needs to indicate, to the terminal device, a beam on a carrier to be used to perform sending and receiving. Therefore, optionally, the method further includes the following step: sending, by the network device, a carrier resource identifier and a beam identifier to the terminal device. For example, {carrier identifier #1, beam identifier #1, . . . , beam identifier #N} is used to indicate that the terminal device is to perform receiving in a receive beam direction corresponding to the beam #1 to beam #N on the carrier #1.

In addition, when the CSI-RS is sent for maintenance and update of the QCL relationship, a scenario in which the network device and the terminal device may maintain a plurality of beam pair links (BPL) may be further considered. For example, on two adjacent carriers, one beam pair may have a spatial QCL relationship (for example, the beam pair undergoes line of sight (LOS)) transmission, and another beam pair may not have a spatial QCL relationship (for example, the beam pair undergoes non-line of sight (NLOS)) transmission. Therefore, the indication information indicating that the plurality of frequency resources in the at least one frequency resource group have a QCL relationship further includes indication information indicating that one or more beams have a QCL relationship.

A beam pair and a carrier maintained between the network device and the terminal device may have the following several forms:

One form is {carrier group #1: carrier 1, carrier 2; beam pair 1; spatial QCL assumption is true}; {carrier group #1: carrier 1, carrier 2; beam pair 2; spatial QCL assumption is false}. This form directly provides an indication indicating whether a beam pair has a QCL relationship.

Another form is a {carrier 1, beam pair 1, CSI-RS resource #1; beam pair 2, CSI-RS resource #2}; {carrier 2, beam pair 1, CSI-RS resource #2; beam pair 2, CSI-RS resource #3}. In this form, whether a beam pair has a QCL relationship may be determined by determining whether antenna ports corresponding to CSI-RS resources of each beam pair have a QCL relationship. For example, if antenna ports corresponding to the CSI-RS resource #1 and the CSI-RS resource #2 have a QCL relationship, the beam pair 1 has a QCL relationship. If antenna ports corresponding to the CSI-RS resource #2 and the CSI-RS resource #3 have a QCL relationship, the beam pair 2 does not have a QCL relationship.

According to the communication method provided in this embodiment of the present invention, specific frequency resource grouping is implemented for each terminal device through information exchange between the network device and the terminal device, so that for one terminal device, frequency resources in each frequency resource group have a QCL relationship, and therefore the network device may serve the terminal device by using the frequency resource group.

The foregoing embodiment mainly describes how to determine a QCL relationship between frequency resources through information exchange between the network device and the terminal device. The following embodiments focus on how to use a QCL relationship between frequency resources after the QCL relationship between the frequency resources is determined, that is, after the frequency resource group is determined.

Figure 7:
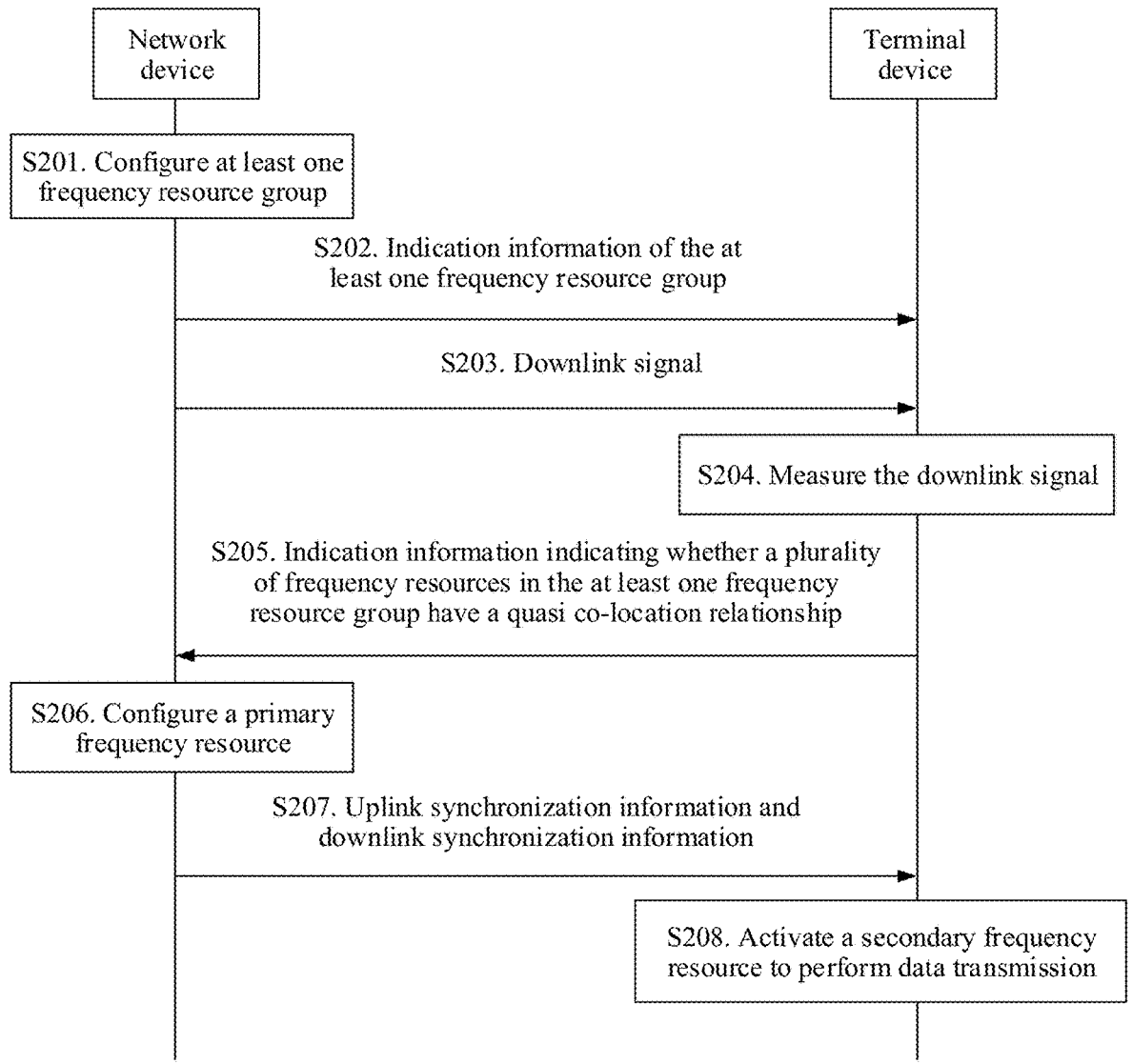
FIG. 7 is a schematic flowchart of another communication method according to an embodiment of the present invention.

FIG. 7 is a schematic flowchart of another communication method according to an embodiment of the present invention. In this embodiment, a scenario in which a terminal device accesses a network device is considered. Before step S201 is performed, the method may further include the following steps:

Step A: The network device sends a downlink signal, for example, a synchronization signal. The network device may send the downlink signal in a plurality of beam directions in a sweeping manner. This is to maintain coverage in a beam-based communications system.

Step B: The terminal device is powered on, detects energy on each frequency, and selects a frequency that meets a condition to initiate access. A carrier corresponding to the accessed frequency is a primary carrier.

The terminal device may measure energy in a plurality of beam directions in a sweeping manner. In the beam-based communications system, a change of a receive beam direction of the terminal device needs to be considered.

Because the network device also performs sending in a sweeping manner, the terminal device may choose to remain on a receive beam direction for a period of time, for example, a period of time not less than an SS block sending period, to detect energy in all directions sent by the network device. If the access condition is not met, the terminal device switches the receive beam direction, and repeats the foregoing detection process.

If the terminal device has N radio frequency links, that is, the terminal device can simultaneously support use of N receive beam directions, the terminal device may choose to simultaneously remain on receive beam directions of a quantity not greater than N for a period of time, for example, a period of time not less than the SS block sending period, to detect energy in all directions sent by the network device. If the condition is not met, the terminal device switches the receive beam directions of a quantity not greater than N, and repeats the foregoing detection process. In this way, the access process can be accelerated.

S201. The network device configures at least one frequency resource group, where each frequency resource group includes one or more frequency resources.

S202. The network device sends indication information of the at least one frequency resource group to the terminal device. The terminal device receives the indication information of the at least one frequency resource group from the network device.

S203. The network device sends, by using at least one beam, a downlink signal on a corresponding frequency resource in the at least one frequency resource group. The terminal device receives the downlink signal from the network device by using at least one beam, where the downlink signal is sent on the corresponding frequency resource in the at least one frequency resource group.

S204. The terminal device measures the downlink signal.

S205. The terminal device reports indication information indicating whether a plurality of frequency resources in the at least one frequency resource group have a QCL relationship. The network device receives, from the terminal device, the indication information indicating whether the plurality of frequency resources in the at least one frequency resource group have a QCL relationship.

For a process, in step S201 to step S205, of determining whether frequency resources have a QCL relationship, refer to the foregoing embodiment.

S206. The network device configures a primary frequency resource for the terminal device.

Because the indication information about the QCL relationship reported by the terminal device includes information such as beam quality, the network device may reconfigure, based on the beam quality information, a frequency resource with a strongest signal in the measurement as a primary frequency resource. In addition, the network device notifies the reconfigured primary frequency resource to the terminal device.

Further, the network device instructs the terminal device to activate and use another frequency resource, that is, the network device sends an activation instruction to the terminal device.

S207. The terminal device obtains, based on the indication information indicating whether the plurality of frequency resources in the at least one frequency resource group have a QCL relationship, synchronization information corresponding to one frequency resource in each frequency resource group.

The terminal device initiates a random access process on a frequency resource that needs to be activated, to obtain synchronization information. The synchronization information includes uplink synchronization information and/or downlink synchronization information, for example, a timing advance (TA). When the synchronization information is obtained, because the frequency resource group is determined above, and the plurality of frequency resources in the frequency resource group have a QCL relationship, the terminal device needs to obtain only synchronization information required for performing synchronization on one frequency resource in each frequency resource group. This is because synchronization information of the frequency resources that have a QCL relationship is the same, and measurement does not need to be performed again. In particular, for another frequency resource that has a QCL relationship with the primary frequency resource, the random access process may be omitted. In this way, the network device can reduce, to some extent, signaling overheads for sending synchronization information.

It should be noted that if the network device preconfigures a frequency resource group, and considers by default that the plurality of frequency resources in the frequency resource group have a QCL relationship, the terminal device may also need to obtain only synchronization information required for performing synchronization on one frequency resource in each frequency resource group, and therefore the network device may reduce, to some extent, signaling overheads for sending synchronization information.

S208. After an indication of activating a secondary frequency resource is received from the network device, the terminal device activates, based on indication information indicating whether the primary frequency resource has a QCL relationship with a plurality of secondary frequency resources, the secondary frequency resource to perform data transmission.

Generally, for example, in a frequency division duplex (FDD) scenario, after an $(n+8)^{th}$ subframe, the secondary frequency resource is activated, and may be used for data transmission. The network device sends, in a subframe n, the indication for activating the secondary frequency resource. In particular, for another secondary frequency resource that has a QCL relationship with the primary frequency resource, the secondary frequency resource may be used for data transmission after a $k^{th}$ subframe, without waiting for eight subframes after the activation indication is received, where $0 \leq k \leq 8$. Therefore, frequency resource utilization can be improved.

According to the communication method provided in this embodiment, specific frequency resource grouping is implemented for each terminal device through information exchange between a network device and a terminal device, so that for one terminal device, frequency resources in each frequency resource group have a QCL relationship, and therefore the network device may serve the terminal device by using the frequency resource group. For a frequency resource group in which a QCL relationship exists, only uplink synchronization information and downlink synchronization information on one frequency resource in the frequency resource group may be measured. This reduces, to some extent, signaling overheads for sending the uplink synchronization information and downlink synchronization information by the network device. For another secondary frequency resource that has a QCL relationship with the primary frequency resource, the secondary frequency resource may be directly used for data transmission, without waiting for eight subframes after the activation indication is received. Therefore, frequency resource utilization can be improved.

The foregoing describes the method in the embodiments in detail, and the following provides apparatuses in the embodiments.

In the embodiments of this application, functional modules of the terminal device or the network device may be divided based on the foregoing method examples. For example, each functional module may be divided to correspond to each function, or two or more functions may be integrated into one processing module. The integrated module may be implemented in a form of hardware, or may be implemented in a form of a software functional module. It should be noted that, in the embodiments of this application, division into the modules is an example, and is merely a logical function division. In actual implementation, another division manner may be used. The following uses an example in which each function module is divided to correspond to each corresponding function for description.

Figure 8:
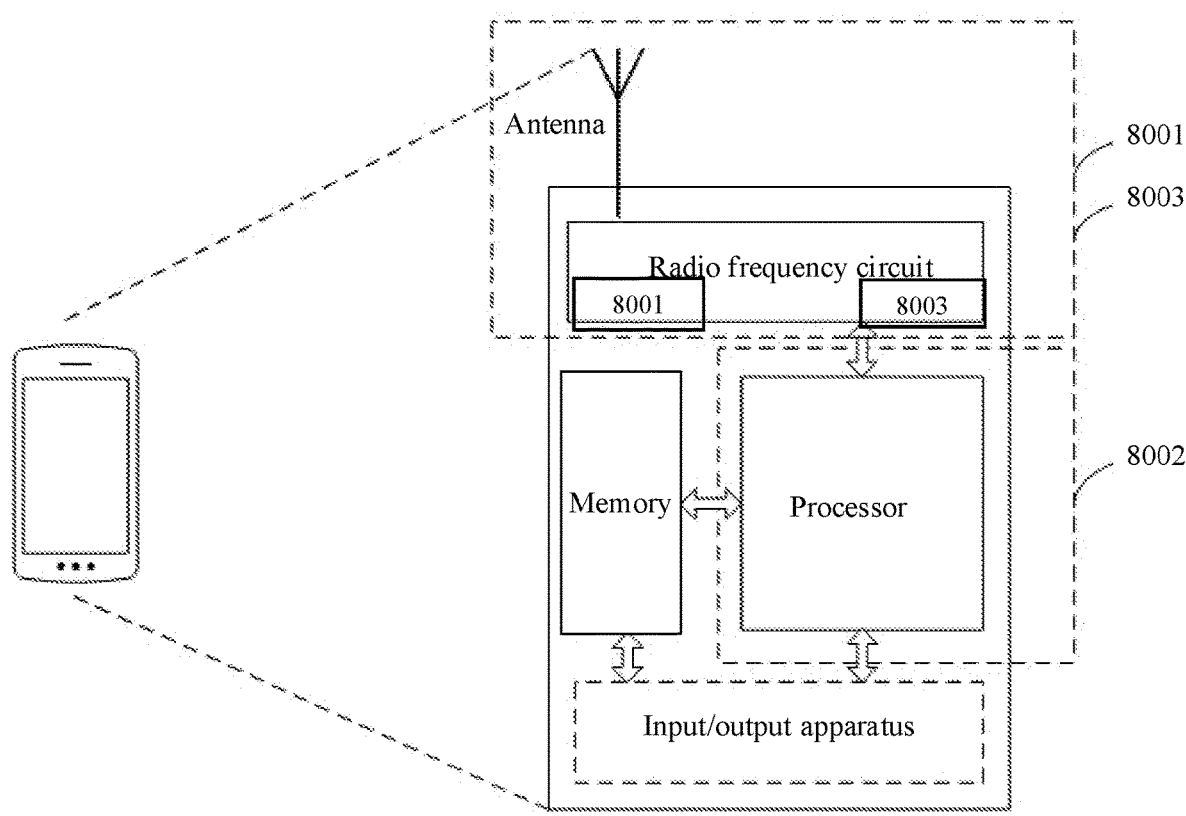
FIG. 8 is a simplified schematic structural diagram of a terminal device according to an embodiment of the present invention.

FIG. 8 is a simplified schematic structural diagram of a terminal device. For ease of understanding and convenience of figure illustration, an example in which the terminal device is a mobile phone is used in FIG. 8. As shown in FIG. 8, the terminal device includes a processor, a memory, a radio frequency circuit, an antenna, and an input and output apparatus. The processor is mainly configured to process a communications protocol and communication data, control the terminal device, execute a software program, process data of a software program, or the like. The memory is mainly configured to store software program and data. The radio frequency circuit is mainly used for conversion between a baseband signal and a radio frequency signal, and processing of the radio frequency signal. The antenna is mainly used for receiving and sending of a radio frequency signal in an electromagnetic wave form. The input/output apparatus, for example, a touchscreen, a display, or a keyboard, is mainly configured to receive data input by a user and output data to the user. It should be noted that some types of terminal devices may not have an input and output apparatus.

When there is data needing to be sent, the processor performs baseband processing on the to-be-sent data, and then outputs a baseband signal to the radio frequency circuit. After performing radio frequency processing on the baseband signal, the radio frequency circuit sends a radio frequency signal in an electromagnetic wave form by using the antenna. When data is sent to the terminal device, the radio frequency circuit receives a radio frequency signal by using the antenna, converts the radio frequency signal into a baseband signal, and outputs the baseband signal to the processor. The processor converts the baseband signal into data, and processes the data. For ease of description, FIG. 8 shows only one memory and only one processor. In an actual terminal device product, there may be one or more processors and one or more memories. The memory may also be referred to as a storage medium, a storage device, or the like. The memory may be disposed independent of the processor, or may be integrated with the processor. This is not limited in this embodiment of this application.

In this embodiment of this application, the antenna and the radio frequency circuit having a transceiver function may be considered as a receiving unit and a sending unit of the terminal device (which may also be collectively referred to as a transceiver unit), and the processor having a processing function may be considered as a processing unit of the terminal device. As shown in FIG. 8, the terminal device includes a receiving unit 8001, a processing unit 8002, and a sending unit 8003. The receiving unit 8001 may also be referred to as a receiver, a receiver circuit, or the like. The sending unit 8003 may also be referred to as a transmitter, a transmitter circuit, or the like. The processing unit may also be referred to as a processor, a processing board, a processing module, a processing apparatus, or the like.

For example, in an embodiment, the receiving unit 8001 is configured to perform step S102 and step S103 in the embodiment shown in FIG. 3, the processing unit 8002 is configured to perform step S104 in the embodiment shown in FIG. 3, and the sending unit 8003 is configured to perform step S105 in the embodiment shown in FIG. 3.

For another example, in another embodiment, the receiving unit 8001 is configured to perform steps S202, S203, and S207 in the embodiment shown in FIG. 7, the processing unit 8002 is configured to perform steps S204 and S208 in the embodiment shown in FIG. 7, and the sending unit 8003 is configured to perform step S205 and S208 in the embodiment shown in FIG. 7.

Figure 9:
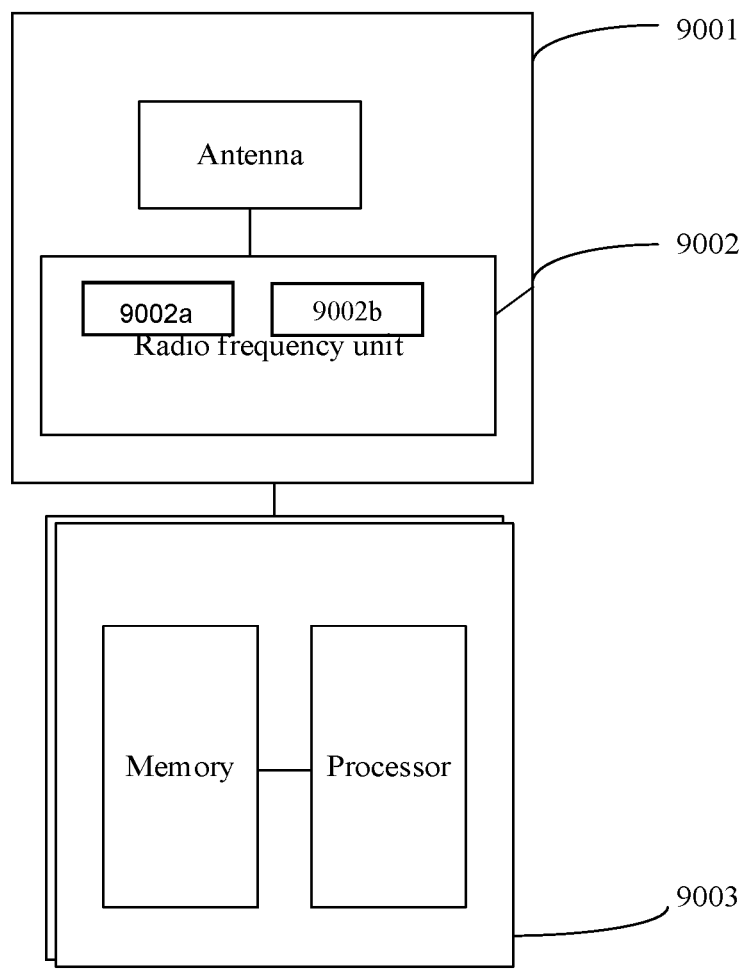
FIG. 9 is a simplified schematic structural diagram of a network device according to an embodiment of the present invention.

FIG. 9 is a simplified schematic structural diagram of a network device. The network device includes a radio frequency signal receiving and sending and conversion part 9001 and a processing unit 9003. The radio frequency signal receiving and sending and conversion part 9001 further includes a radio frequency unit 9002 having a receiving unit 9002a and a sending unit 9002b (which may also be collectively referred to as a transceiver unit). The radio frequency signal receiving and sending and conversion part 9001 is mainly used for receiving and sending of a radio frequency signal and conversion between the radio frequency signal and a baseband signal. The processing unit 9003 is mainly used for baseband processing and controlling the network device. The receiving unit 9002a may also be referred to as a receiver, a receiver circuit, or the like. The sending unit 9002b may also be referred to as a transmitter, a transmitter circuit, or the like. The processing unit 9003 is usually a control center of the network device is configured to control the network device to perform steps performed by the network device in FIG. 3 or FIG. 7. For details, refer to descriptions of the foregoing related parts.

The processing unit 9003 may include one or more boards. Each board may include one or more processors and one or more memories. The processor is configured to read and execute a program in the memory to implement a baseband processing function and control the network device. If there are a plurality of boards, the boards may be interconnected to improve a processing capability. In an optional implementation, a plurality of boards may share one or more processors, or a plurality of boards may share one or more memories.

For example, in an embodiment, the processing unit 9003 is configured to perform step S101 in the embodiment shown in FIG. 3, the sending unit 9002a is configured to perform steps S102 and S103 in the embodiment shown in FIG. 3, and the receiving unit 9002b is configured to perform step S105 in the embodiment shown in FIG. 3.

For another example, in another embodiment, the processing unit 9003 is configured to perform steps S201 and S206 in the embodiment shown in FIG. 7, the sending unit 9002a is configured to perform steps S202, S203, and S207 in the embodiment shown in FIG. 7, and the receiving unit 9002b is configured to perform step S205 in the embodiment shown in FIG. 7.

In another optional implementation, with development of system on chip (SoC) technologies, some or all of functions of the a radio frequency signal receiving and sending and conversion part 9001, the radio frequency unit 9002 part and the processing unit 9003 part may be implemented by using the SoC technology, for example, be implemented by using a base station function chip. The base station function chip is integrated with devices such as a processor, a memory, and an antenna interface, a program of a base station-related function is stored in the memory, and the program is executed by the processor to implement the base station-related function. Optionally, the base station function chip can further read a memory outside the chip to implement a related function of a base station.

A second embodiment resolves different technical problems.

To improve a transmission rate and efficiency of a wireless communications system, in a 5th generation new radio (5G NR) communications system, a network device and a terminal device communicate with each other by using a beam. A characteristic of the beam is that energy of a signal is concentrated in a direction. The network device and the terminal device may generate a beam by using a beamforming technology. The beamforming technology is specifically a digital beamforming technology, an analog beamforming technology, and a hybrid beamforming technology. The beam communication method can effectively enhance an anti-interference capability of a signal, thereby achieving a comparatively high transmission rate and efficiency. A complex channel environment between the network device and the terminal device causes failure of normal communication. Therefore, a status of a beam failure needs to be quickly and accurately detected, and how to detect the beam failure is a current research focus.

A technical problem to be resolved in the second embodiment is to provide a communication method, so as to quickly detect the status of the beam failure.

In an LTE communications system, a channel is sent in a form of a radio frame (RF), one radio frame includes 10 subframes (subframe), a length of each subframe is 1 millisecond (ms), each subframe includes two slots (slot), and a length of each slot is 0.5 milliseconds. A quantity of symbols included in each slot is related to a length of a cyclic prefix (CP) in a subframe. If the cyclic prefix is a normal cyclic prefix (normal CP), each slot includes seven symbols, and each subframe includes 14 symbols. If a cyclic prefix is an extended cyclic prefix (extended CP), each slot includes six symbols, and each subframe includes 12 symbols. In a long term evolution communications system, a resource element (RE) is a minimum unit in time-frequency domain, and is uniquely identified by an index pair (k, l), where k is a subcarrier index, and l is a symbol index.

Figure 10:
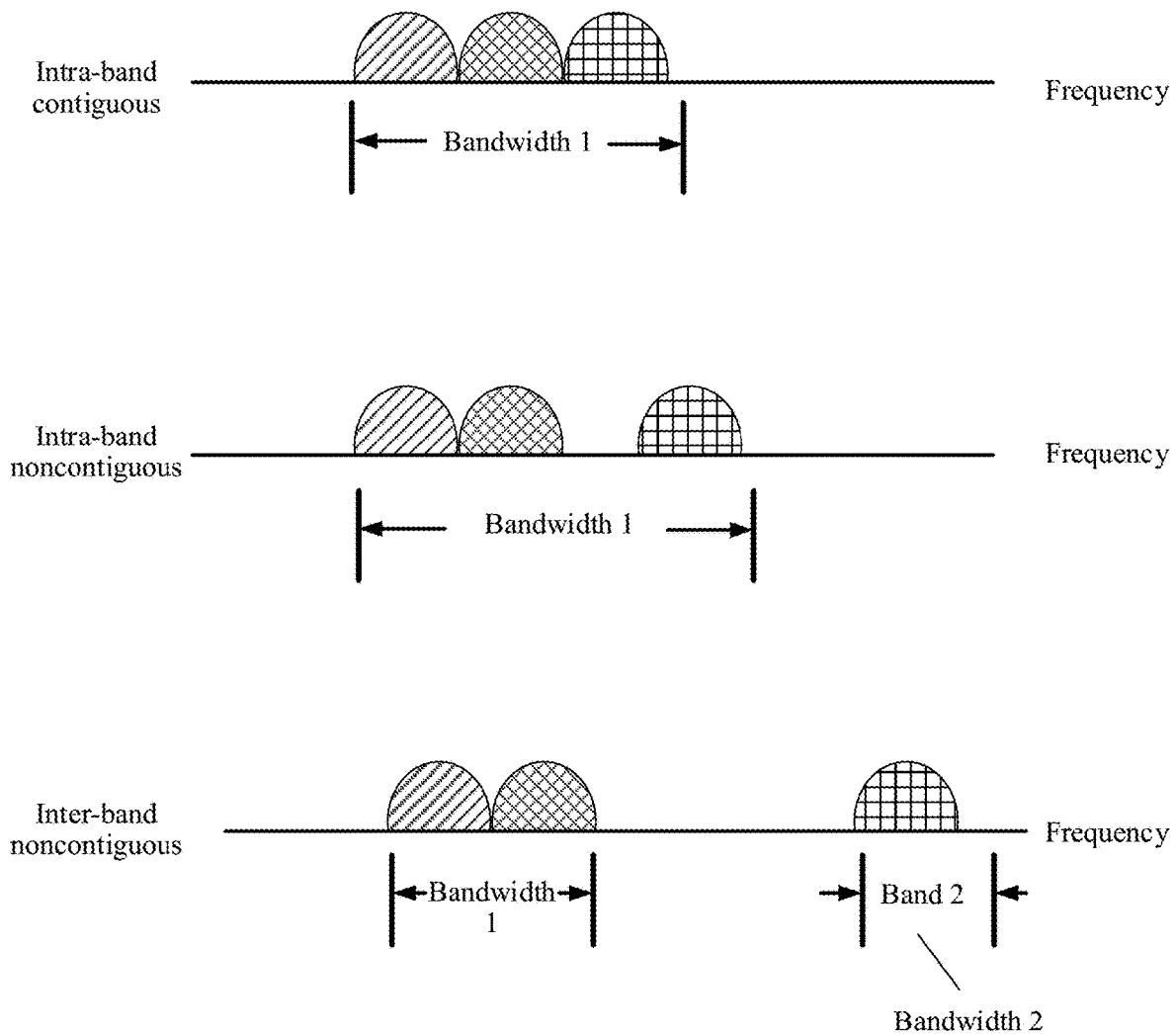
FIG. 10 is a schematic diagram of carrier aggregation according to an embodiment of the present invention.

In the long term evolution (LTE) communications system, simultaneous data transmission on a plurality of carriers is supported, to increase system bandwidth, and improve a data transmission rate. For example, FIG. 10 shows a carrier aggregation (CA) mode in the long term evolution communications system. In the carrier aggregation mode, a plurality of intra-band contiguous carrier components may be aggregated in the communications system, or a plurality of intra-band noncontiguous carriers are aggregated, or a plurality of inter-band noncontiguous carrier components are aggregated.

For another example, in a dual connectivity (DC) scenario, the terminal device is connected to both a master cell (master cell) and a secondary cell (secondary cell), and the terminal device simultaneously performs uplink transmission and downlink transmission by using the master cell and the secondary cell, where the master cell corresponds to a primary carrier component, and the secondary cell corresponds to a secondary carrier component.

In the long term evolution communications system, a physical layer of the terminal device monitors link quality to determine an out-of-synchronization state or an in-synchronization state, and reports the state to an upper layer. A monitoring method is as follows: when the link quality measured by the physical layer of the terminal device is less than a first threshold, sending, by the terminal device, an out-of-synchronization (out of sync) indication to the upper layer; when the link quality measured by the physical layer of the terminal device is greater than a second threshold, sending, by the terminal device, an in-synchronization (in sync) indication to the higher layer. When consecutively receiving N out-of-synchronization indications, the upper layer of the terminal device determines that the link fails, and sends a link recovery request to the network device. In addition, the terminal device starts a timer with timing duration of T1. If the timer expires, it is determined that the link fails to be recovered. Within T1, if the terminal device consecutively receives M synchronization indications, the terminal device determines that the link is recovered, and in this case, the terminal device stops the timer.

In conclusion, there is no beam detection method disclosed in the current long term evolution communications system. If a link detection method in the long term evolution communications system is applied to beam detection, a determining process usually consumes a relatively long time, and a communication delay is increased.

In a beam detection method provided in an embodiment, a network device sends, to a terminal device, configuration information indicating that a QCL relationship exists in a frequency resource group, and sends a downlink signal on the frequency resource group. In this way, the terminal device may measure, based on the QCL relationship in the frequency resource group, the downlink signal on a plurality of frequency resources that have a QCL relationship, to obtain more measurement opportunities. Compared with single-carrier beam detection, beam detection accuracy can be effectively improved, and a detection time can be reduced.

Figure 11A:
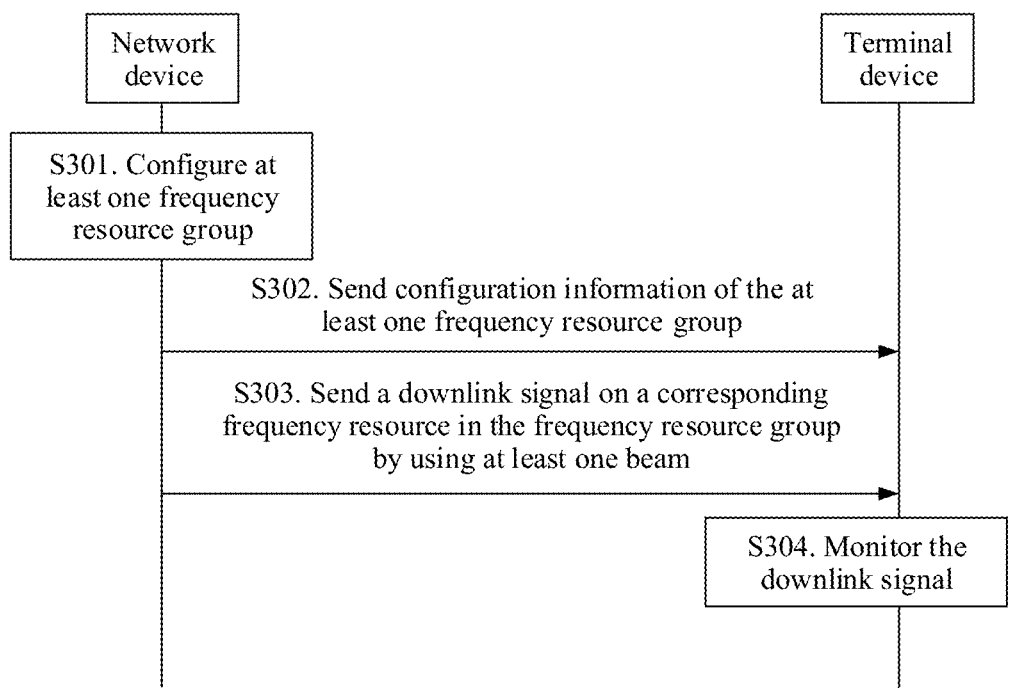
FIG. 11a is a schematic flowchart of a communication method according to an embodiment of the present invention.
Figure 11B:
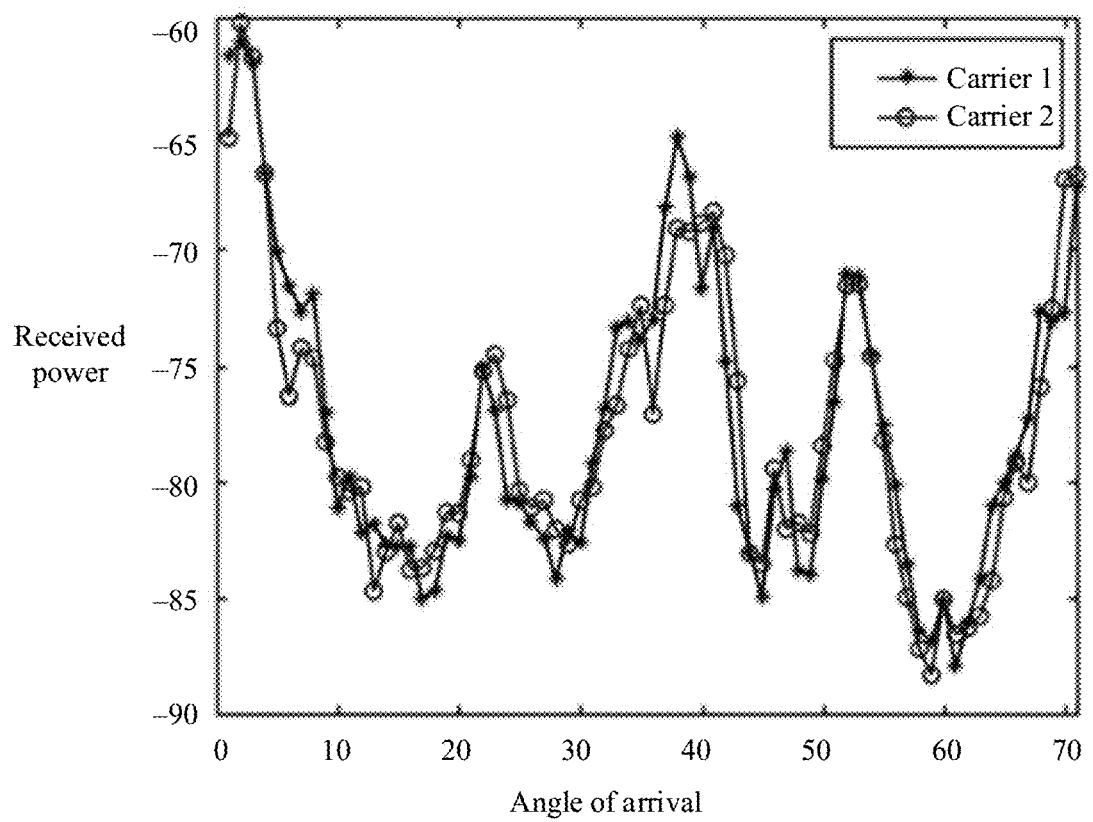
FIG. 11b is a schematic diagram of distribution of received power with respect to angles of arrival.

FIG. 11a shows a communication method according to an embodiment. The method includes but is not limited to the following steps.

S301. The network device configures at least one frequency resource group.

The frequency resource indicates a resource that is used to transmit data in frequency domain, each frequency resource group includes at least two frequency resources, and the frequency resource may be a carrier component (CC) or a bandwidth part (BP). The network device determines, based on a measurement parameter of a frequency resource reported by the terminal device, frequency resources that have a QCL relationship, and groups the frequency resources that have a QCL relationship into at least one frequency resource group. The measurement parameter includes at least one of delay spread, an average delay, Doppler spread, an average gain, a receive beam number of the terminal device, a transmit/receive channel correlation, an angle of arrival (AOA), a spatial correlation of a receive antenna, a dominant angle of arrival, or an average angle of arrival.

The QCL relationship indicates that a plurality of antenna ports have at least one same or similar communication feature. For example, that a carrier component 1 has a QCL relationship with a carrier component 2 means that an antenna port on which the carrier component 1 is sent has a QCL relationship with an antenna port on which the carrier component 2 is sent. For another example, that a beam 1 has a QCL relationship with a beam 2 means that an antenna port on which a downlink signal corresponding to the beam 1 is sent has a QCL relationship with an antenna port on which a downlink signal corresponding to the beam 2 is sent.

Figure 11C:
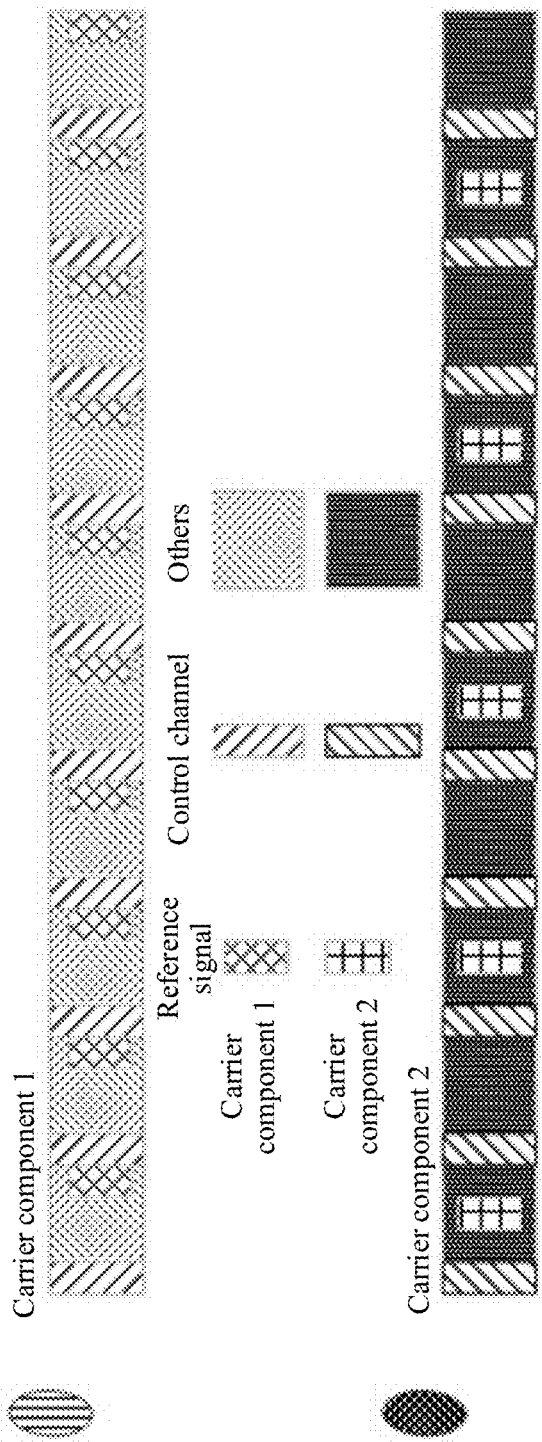
FIG. 11c is another schematic structural diagram of a carrier component according to an embodiment of the present invention.

Referring to FIG. 11c, a frequency resource is a carrier component, one frequency resource group includes two carrier components: the carrier component 1 and the carrier component 2, and the carrier component 1 has a QCL relationship with the carrier component 2. The network device determines, based on the measurement parameter reported by the terminal device, that distribution of received powers of the carrier component 1 and the carrier component 2 has a similarity at an angle of arrival, and determines that the carrier component 1 has a QCL relationship with the carrier component 2 with respect to spatial parameters, that is, the carrier component 1 has a QCL relationship with the carrier component 2. The carrier component 1 and the carrier component 2 may be adjacent carrier components, or may be non-adjacent carrier components.

S302. The network device sends configuration information of the at least one frequency resource group to the terminal device, and the terminal device receives the configuration information, of the at least one frequency resource group, sent by the network device, where the configuration information includes indication information indicating that at least two frequency resources included in the frequency resource group have a QCL relationship.

Specifically, the network device may send the configuration information of the at least one frequency resource group by using any one of RRC signaling, a MAC-CE message, or DCI. For example, all parameters of the configuration information may be sent by using one piece of signaling. Alternatively, all the parameters of the configuration information may be sent by using a plurality of pieces of signaling, where each piece of signaling is used for sending only some parameters of the configuration information. This is not limited in this embodiment.

In a possible implementation, the configuration information further includes:

at least one of a first phase count value (which may also be referred to as a counter or a timer) or a first phase time window of the frequency resource group; and/or at least one of a first phase count value (which may also be referred to as a counter or a timer) or a first phase time window of each frequency resource in the frequency resource group.

In another possible implementation, the configuration information further includes:

at least one of a second phase count value and a second phase time window of the frequency resource group; and/or at least one of a second phase count value and a second phase time window of each frequency resource in the frequency resource group.

In still another possible implementation, the configuration information further includes timing duration of the frequency resource group and timing duration of each frequency resource in the frequency resource group.

The first phase count value is a count value in a beam detection phase, and the second phase count value is a count value in a beam recovery phase. The first phase time window and the second phase time window each are a time interval with preset duration, the first phase time window is a time window in the beam detection phase, and the second phase time window is a time window in the beam recovery phase. When there are a plurality of frequency resource groups, first phase count values, first phase time windows, second phase time windows, second phase count values, and timing duration that are set for different frequency resource groups may be the same, or may be different. The first phase count value, the first phase time window, the second phase time window, the second phase count value, and the timing duration of the frequency resource group may have an association relationship with each frequency resource in the frequency resource group. For example, the first phase count value of the frequency resource group is equal to a value obtained by adding up first phase count values of each frequency resource in the frequency resource group, or the first phase count value of the frequency resource group is equal to a smallest first phase count value corresponding to each frequency resource in the frequency resource group. For other parameters, reference may be made to the foregoing association relationship. Details are not described herein again.

It should be noted that at least one of the first phase count value, the first phase time window, the second phase time window, the second phase count value, and the timing duration of the frequency resource group and the first phase count value, the first phase time window, the second phase time window, the second phase count value, and the timing duration of each frequency resource in the frequency resource group may be prestored or preconfigured on the network device and the terminal device, or may be configured by the network device and then sent to the terminal device by using signaling.

For example, referring to the example in S201, a carrier component group includes the carrier component 1 and the carrier component 2, and the carrier component 1 has a QCL relationship with the carrier component 2. A first phase count value of the carrier component group is N11, a first phase time window is W11, a second phase count value is N12, and timing duration is T11. A first phase count value of the carrier component 1 is N21, a first phase time window is W21, a second phase count value is N22, and timing duration is T21. A first phase count value of the carrier component 2 is N31, a first phase time window is W31, a second phase count value is N32, and timing duration is T31. N11=N21+N31, or N11=min(N21, N31).

In a possible implementation, the configuration information further includes: an identifier of the frequency resource group, an identifier of a reference frequency resource in the frequency resource group, an identifier of each frequency resource in the frequency resource group, a mapping relationship between the frequency resource in the frequency resource group and a beam, and beam indication information of at least one beam associated with each frequency resource in the frequency resource group.

The identifier of the frequency resource group is used to uniquely identify an identity of the frequency resource group, and the reference frequency resource may be any frequency resource in the frequency resource group. For example, when the frequency resource is a carrier component, when there is a primary carrier component in the carrier component group, the reference frequency resource is the primary carrier component in the carrier component group; or when there is no primary carrier component in the carrier component group, the reference frequency resource is any one carrier component specified by the network device. The identifier of the reference frequency resource is used to represent an identity of the reference frequency resource, and the identifier of the frequency resource is used to represent an identity of the frequency resource. Each frequency resource in the frequency resource group is associated with at least one beam. When one frequency resource is associated with a plurality of beams, the plurality of beams usually have no QCL relationship. The beam indication information is used to represent an identity of a beam, and the beam indication information includes at least one of a beam index, a CSI-RS resource number of the beam, and an SRS resource number of the beam. Optionally, the network device may further allocate a QCL identifier to beams that have a QCL relationship in beams associated with the frequency resource group, to indicate the beams that have a QCL relationship in the frequency resource group.

For example, identifiers of the frequency resources in the frequency resource group are as follows: CC group #1: (CC #1, CC #2), where CC group #1 is the identifier of the frequency resource group, CC #1 is an identifier of the carrier component 1, CC #2 is an identifier of the carrier component 2, and the carrier component 1 is a reference carrier component. The carrier component 1 and the carrier component 2 each are associated with two beams, and a mapping relationship between the carrier component and the beam is represented as: (CC #1 BPL 1, CC #1 BPL 2; CC #2 BPL 1, CC #2 BPL 2). It is assumed that a beam indicated by CC #1 BPL 1 has a QCL relationship with a beam indicated by CC #2 BPL 1, and the network device may directly notify the foregoing QCL relationship, or may allocate one QCL identifier (QCL FLAG) to beams that have a QCL relationship, for example: (CC #1 BPL 1 QCL FLAG, CC #1 BPL 2; CC #2 BPL 2), indicating that a carrier 1 of the carrier component 1 has a QCL relationship with a carrier 1 of the carrier component 2, where BPL is the beam indication information.

In a possible implementation, the configuration information of the frequency resource group further includes:

at least one of an antenna port number, a time-frequency resource location, and a period of a downlink signal on each frequency resource in the frequency resource group.

Downlink signals on different frequency resources have different configurations. For example, periods of downlink signals on frequency resources in the frequency resource group are different, and a period of a downlink signal on the reference frequency resource is less than a period of a downlink signal on a non-reference frequency resource.

FIG. 11c is a schematic structural diagram of a carrier component. It can be seen from FIG. 11c that, a carrier component group includes the carrier component 1 and the carrier component 2, the carrier component 1 and the carrier component 2 each are associated with one beam, and a beam associated with the carrier component 1 has a QCL relationship with a beam associated with the carrier component 2. Therefore, the two beams have a same beam direction. Downlink signals and control channels are configured for the carrier component 1 and the carrier component 2, and the downlink signal on the carrier component 1 has a different time-frequency location and period from that on the carrier component 2.

S303. The network device sends a downlink signal on a corresponding frequency resource in the at least one frequency resource group by using at least one beam, and the terminal device receives the downlink signal from the network device on the corresponding frequency resource in the at least one frequency resource group by using at least one beam.

Specifically, for any frequency resource in the frequency resource group, the network device sends one or more downlink signals on each frequency resource, where the downlink signal may be a CSI-RS or an SS block.

For example, according to the example of S202, the network device sends one downlink signal on the carrier component 1 and the carrier component 2 respectively, and the terminal device receives one downlink signal on the carrier component 1 and the carrier component 2 respectively.

It should be noted that the network device may be one base station, and the one base station sends a downlink signal to the terminal device on the frequency resource group. The network device may be a plurality of base stations, and each base station sends a downlink signal to the terminal device on one or more frequency resources.

For example, the base station sends a downlink signal 1 to the terminal device on the carrier component 1, and sends a downlink signal 2 to the terminal device on the carrier component 2.

For another example, a base station 1 sends the downlink signal 1 to the terminal device on the carrier component 1, and a base station 2 sends the downlink signal 2 to the terminal device on the carrier component 2.

S304. The terminal device monitors the downlink signal.

The terminal device may monitor the downlink signal based on a beam detection rule indicated by the network device or a preconfigured beam detection rule. The terminal device may detect a beam by using a signal quality parameter of a downlink signal on each frequency resource in the frequency resource group. A physical layer of the terminal device measures the signal quality parameter of the downlink signal, and when the signal quality parameter of the downlink signal is less than a first threshold, determines that beam quality is poor. When the signal quality parameter of the downlink signal is greater than a second threshold, the terminal device determines that the beam quality is good. The signal quality parameter includes one or more of reference signal received power (RSRP), do reference signal received quality (RSRQ), a received signal strength indicator (RSSI), and an SNR.

In a possible implementation, the monitoring, by the terminal device, the downlink signal specifically includes:

when detecting N1 consecutive times that the beam quality is poor, determining, by the terminal device, that a beam associated with the frequency resource group fails.

N1 is a first phase count value of the frequency resource group. The physical layer of the terminal device measures, signal quality parameters of downlink signals on all frequency resources in the frequency resource group. When detecting that the signal quality parameter is less than the first threshold, the physical layer of the terminal device determines that the beam quality is poor. When detecting N1 times that the beam quality is poor, the terminal device determines that the beam associated with the frequency resource group fails. That the beam associated with the frequency resource group fails indicates that one or more beams in the frequency resource group fail. Further, that the beam associated with the frequency resource group fails may be that the beams that have a QCL relationship in the beams associated with the frequency resource group fail.

For example, N1=3, the carrier component group includes the carrier component 1 and the carrier component 2, the carrier component 1 is associated with the carrier 1 and the carrier 2, the carrier component 2 is associated with a carrier 3 and a carrier 4, the carrier 1 has a QCL relationship with the carrier 3, the carrier component 1 is configured with a CSI-RS 1, and the carrier component 2 is configured with a CSI-RS 2. The physical layer of the terminal device detects signal quality parameters of the CSI-RS 1 and the CSI-RS 2, and when the signal quality parameter is less than the first threshold, determines that the beam quality is poor, or when detecting three consecutive times, that the beam quality is poor, the terminal device determines that the carrier 1 and the carrier 3 fail.

In another possible implementation, when detecting that, in a first phase time window W1, a signal quality parameter on the frequency resource group is less than a preset threshold, the terminal device determines that the beam associated with the frequency resource group fails.

W1 is a first phase time window of the frequency resource group, and the first phase time window is a time window for a beam detection phase. The physical layer of the terminal device measures, a plurality of times in W1, the signal quality parameters of all the downlink signals on the frequency resource group, and calculates an average of the signal quality parameters obtained through the plurality of times of measurement. If the average is less than the preset threshold, the terminal device determines that the beam associated with the frequency resource group fails. That the beam associated with the frequency resource group fails indicates that one or more beams in the frequency resource group fail. Further, that the beam associated with the frequency resource group fails may be that the beams that have a QCL relationship in the beams associated with the frequency resource group fail.

For example, the carrier component group includes the carrier component 1 and the carrier component 2, the carrier component 1 is associated with the beam 1 and the beam 2, the carrier component 2 is associated with a beam 3 and a beam 4, the beam 2 has a QCL relationship with the beam 4, the carrier component 1 is associated with the downlink signal 1, and the carrier component 2 is associated with the downlink signal 2. Duration of the first phase time window W1 is 10 ms. The physical layer of the terminal device measures, a plurality of times in the 10-ms first phase time window W1, signal quality parameters of the downlink signal 1 and the downlink signal 2, and calculates an average of the signal quality parameters obtained through the plurality of times of measurement. If the average is less than the preset threshold, the terminal device determines that the beam 2 and the beam 4 fail.

In still another possible implementation, when detecting N1 consecutive times in the first phase time window W1 that the beam quality is poor, the terminal device determines that the beam associated with the frequency resource group fails.

The physical layer of the terminal device measures, in the time window W1, the signal quality parameters of all the downlink signals on the frequency resource group. When it is measured that a signal quality parameter of any downlink signal is less than the first threshold, the terminal device determines that it is detected once that the beam quality is poor. When detecting N1 consecutive times in the first time window W1 that the poor beam quality is poor, the higher layer of the terminal device determines that the beam associated with the frequency resource group fails. That the beam associated with the frequency resource group fails indicates that one or more beams in the frequency resource group fail. Further, that the beam associated with the frequency resource group fails may be that the beams that have a QCL relationship in the beams associated with the frequency resource group fail.

In yet another possible implementation, when detecting N1 consecutive times that the signal quality parameter on the frequency resource group is less than the preset threshold in the first phase time window W1, the terminal device determines that the beam associated with the frequency resource group fails.

The physical layer of the terminal device measures, a plurality of times in the first phase time window W1, the signal quality parameters of all the downlink signals on the frequency resource group, and calculates an average of the signal quality parameters that are measured a plurality of times. If the average is less than the preset threshold, the terminal device determines that the beam quality in the current first phase time window is poor. When detecting, in the foregoing measurement manner, N1 consecutive times that the beam quality is poor, the terminal device determines that the beam associated with the frequency resource group fails. That the beam associated with the frequency resource group fails indicates that one or more beams in the frequency resource group fail. Further, that the beam associated with the frequency resource group fails may be that the beams that have a QCL relationship in the beams associated with the frequency resource group fail.

According to the foregoing beam detection method for a related parameter of the frequency resource group, this embodiment further includes:

when it is detected N2 consecutive times that the beam quality is good, determining that the beam associated with the frequency resource group is successfully recovered.

N2 is the second phase count value of the frequency resource group. When the beams that have a QCL relationship in the beams associated with the frequency resource group fail, the terminal device sends a beam recovery request to the network device, where the beam recovery request is used to recover the beam that fails. Then the terminal device measures the signal quality parameters of all the downlink signals on the frequency resource group. When a signal quality parameter of any downlink signal is greater than the second threshold, the terminal device determines that it is detected once that the beam quality is good. When detecting N2 consecutive times that the beam quality is good, the terminal device determines that the failed beam is successfully recovered.

In still yet another possible implementation, when detecting that, in a second phase time window W2, the signal quality parameter of the downlink signal on the frequency resource group is greater than the preset threshold, the terminal device determines that the beam associated with the frequency resource group is successfully recovered.

The second phase time window W2 is a time window of the frequency resource group in the beam recovery phase. The physical layer of the terminal device measures, a plurality of times in the second phase time window W2, the signal quality parameters of all the downlink signals on the frequency resource group, and calculates an average of the signal quality parameters that are measured a plurality of times. If the average is greater than the preset threshold, the terminal device determines that the beams that have a QCL relationship in the frequency resource group are successfully recovered.

In a further possible implementation, when it is detected N2 times in the second phase time window W2 that the beam quality is good, it is determined that the beam associated with the frequency resource group is successfully recovered.

The physical layer of the terminal device measures, in the second phase time window 2, the signal quality parameters of all the downlink signals on the frequency resource group. If the signal quality parameter of the downlink signal is greater than the second threshold, the terminal device determines that it is detected once that the beam quality is good. When detecting N2 times that the beam quality is good in W2, the terminal device determines that the beams that have a QCL relationship in the frequency resource group are successfully recovered.

In a still further possible implementation, when detecting N2 consecutive times that, the signal quality parameter of the downlink signal on the frequency resource group is greater than the preset threshold in the second phase time window W2, the terminal device determines that the beam associated with the frequency resource group is successfully recovered.

The physical layer of the terminal device measures, a plurality of times in the second phase time window W2, the signal quality parameters of all the downlink signals on the frequency resource group, and calculates an average of the signal quality parameters that are measured a plurality of times. If the average is greater than the preset threshold, the terminal device determines that the beam quality in the current second phase time window is good. When detecting, in the foregoing measurement manner, N2 consecutive times that the beam quality is good, the terminal device determines that the beams that have a QCL relationship in the beams associated with the frequency resource group are successfully recovered.

According to the foregoing process in which the beam associated with the frequency resource group is successfully recovered, the method further includes:

when the beam associated with the frequency resource group fails, starting a timing operation of timing duration T1;

when the beam associated with the frequency resource group is successfully recovered, stopping the timing operation of the timing duration T1; and when the timing operation expires, determining that the beam associated with the frequency resource group fails to be recovered.

When the beam associated with the frequency resource group is successfully recovered, parameters such as the timing duration, the second phase count value, and the second phase time window are reset to zero.

In a possible implementation, the monitoring, by the terminal device, the downlink signal specifically includes:

when it is detected N1 consecutive times that the beam quality is poor on the reference frequency resource, determining that the beam associated with the reference frequency resource fails.

The reference frequency resource is located in any one of the at least one frequency resource group. The physical layer of the terminal device measures a signal quality parameter of a downlink signal on the reference frequency resource. When the measured signal quality parameter is less than the first threshold, when the physical layer of the terminal device determines that it is detected once that the beam quality is poor, or when the physical layer of the terminal device detects N1 consecutive times that the beam quality is poor, the terminal device determines that the beam associated with the reference frequency resource fails.

For example, the frequency resource is a carrier component, N1=3 carrier component group includes the carrier component 1 and the carrier component 2, the carrier component 1 is a reference carrier component, the carrier component 1 is associated with the beam 1 and the beam 2, the carrier component 2 is associated with the beam 3 and the beam 4, the carrier component 1 is configured with the CSI-RS 1, and the carrier component 2 is configured with the CSI-RS 2. The physical layer of the terminal device measures the signal quality parameter of the CSI-RS 1. When the signal quality parameter of the CSI-RS 1 is less than the first threshold, the terminal device determines that it is detected once that the beam quality is poor. When detecting three consecutive times, that the beam quality is poor, the physical layer of the terminal device determines that the beam 1 and the beam 2 that are associated with the reference carrier component fail.

In another possible implementation, the monitoring, by the terminal device, the downlink signal specifically includes:

when it is detected that, in the first phase time window W1, a signal quality parameter on the reference frequency resource is less than the preset threshold, determining that the beam associated with the reference frequency resource fails.

The physical layer of the terminal device measures, a plurality of times in the time window W1, the signal quality parameter of the downlink signal on the reference frequency resource, and calculates an average of the signal quality parameters that are measured a plurality of times. If the average of the signal quality parameters is less than the first threshold, the terminal device determines that the beam associated with the reference frequency resource fails.

In a possible implementation, the monitoring, by the terminal device, a beam associated with two frequency resources specifically includes:

when it is detected N1 consecutive times in the time window W1 that the beam quality is poor on the reference frequency resource, determining that the beam associated with the reference frequency resource fails.

The physical layer of the terminal device measures, in the time window W1, the signal quality parameter of the downlink signal on the reference frequency resource. When the signal quality parameter is less than the first threshold, the terminal device determines that it is detected once that the beam quality is poor. When detecting N1 consecutive times that the poor beam quality is poor, the physical layer of the terminal device determines that the beam associated with the reference frequency resource fails.

In another possible implementation, the detecting, by the terminal device, the downlink signal specifically includes:

when it is detected N1 consecutive times that, the signal quality parameter on the reference frequency resource is less than the preset threshold in the first phase time window W1, determining that the beam associated with the reference frequency resource fails.

The physical layer of the terminal device measures, a plurality of times in the first phase time window W1, the signal quality parameter of the downlink signal on the reference frequency resource, and calculates an average of the signal quality parameters that are measured a plurality of times. If the average is less than the preset threshold, the terminal device determines that the beam quality in the current first phase time window is poor. When detecting, in the foregoing measurement manner, N1 consecutive times that the beam quality is poor, the terminal device determines that the beams that have a QCL relationship in the beams associated with the reference frequency resource fail.

According to the foregoing method for monitoring a beam by using related parameters of the reference frequency resource, the configuration information further includes: at least one of a second phase count value N2 and a second phase time window W2 of the reference frequency resource. This embodiment further includes the following step:

when the beam associated with the reference frequency resource fails, if it is detected N2 consecutive times that the beam quality on the reference frequency resource is good, determining that the beam associated with the reference frequency resource is successfully recovered.

When the beam associated with the reference frequency resource fails, the physical layer of the terminal device measures, the signal quality parameter of the downlink signal associated with the reference frequency resource. When the signal quality parameter is greater than the second threshold, the terminal device sends a synchronization indication to the higher layer. When the higher layer of the terminal device receives, N2 consecutive times, an indication indicating that the beam quality is good, the higher layer of the terminal device determines that the beam associated with the reference frequency resource is successfully recovered.

The second phase time window W2 is a time window of the reference frequency resource in the beam recovery phase. The physical layer of the terminal device measures, a plurality of times in the second phase time window W2, the signal quality parameter of the downlink signal on the reference frequency resource, and calculates an average of the signal quality parameters that are measured a plurality of times. If the average is greater than the preset threshold, the terminal device determines that the beam associated with the reference frequency resource is successfully recovered.

In still another possible implementation, the detecting, by the terminal device, the downlink signal specifically includes:

when it is detected N2 times in the second phase time window W2 that the beam quality is good on the reference frequency resource, determining that the beam associated with the reference frequency resource is successfully recovered.

The physical layer of the terminal device measures, in the second phase time window, the signal quality parameter of the downlink signal on the reference frequency resource. If the signal quality parameter of the downlink signal is greater than the second threshold, the terminal device determines that it is detected once that the beam quality is good. When detecting N2 times in W2 that the beam quality is good, the terminal device determines that the beam associated with the reference frequency resource is successfully recovered.

In yet another possible implementation, the detecting, by the terminal device, the downlink signal specifically includes:

when it is detected N2 consecutive times that, the signal quality parameter of the downlink signal on the frequency resource group is greater than the preset threshold in the second phase time window W2, determining that the beam associated with the reference frequency resource is recovered successfully.

The physical layer of the terminal device measures, a plurality of times in the second phase time window W2, the signal quality parameter of the downlink signal on the reference frequency resource, and calculates an average of the signal quality parameters that are measured a plurality of times. If the average is greater than the preset threshold, the terminal device determines that the beam quality in the current second phase time window is good. When detecting, in the foregoing measurement manner, N2 consecutive times that the beam quality is good, the terminal device determines that the beam associated with the reference frequency resource is successfully recovered.

According to the foregoing process in which the beam associated with the reference frequency resource is successfully recovered, the configuration information further includes: timing duration T1 associated with the reference frequency resource; and the method further includes:

when the beam associated with the reference frequency resource fails, starting a timing operation of the timing duration T1;

when the beam associated with the reference frequency resource is successfully recovered, stopping the timing operation of the timing duration T1; and when the timing operation expires, determining that the beam associated with the reference frequency resource fails to be recovered.

In a possible implementation, the configuration information further includes at least one of a first phase count value and a time window of each frequency resource in the frequency resource group.

In a possible implementation, the configuration information further includes timing duration of each frequency resource in the frequency resource group.

For monitoring, by the terminal device, a beam associated with each frequency resource in the frequency resource group, refer to the foregoing description of monitoring the reference frequency resource, and details are not described herein again.

During implementation of the foregoing embodiment, the network device sends, to the terminal device, the configuration information indicating that a QCL relationship exists in the frequency resource group, and sends the downlink signal on the frequency resource group. In this way, the terminal device may measure, based on the QCL relationship in the frequency resource group, the downlink signal on a plurality of frequency resources that have a QCL relationship, to obtain more measurement opportunities. Compared with single-carrier beam detection, beam detection accuracy can be effectively improved, and a detection time can be reduced.

Figure 12A:
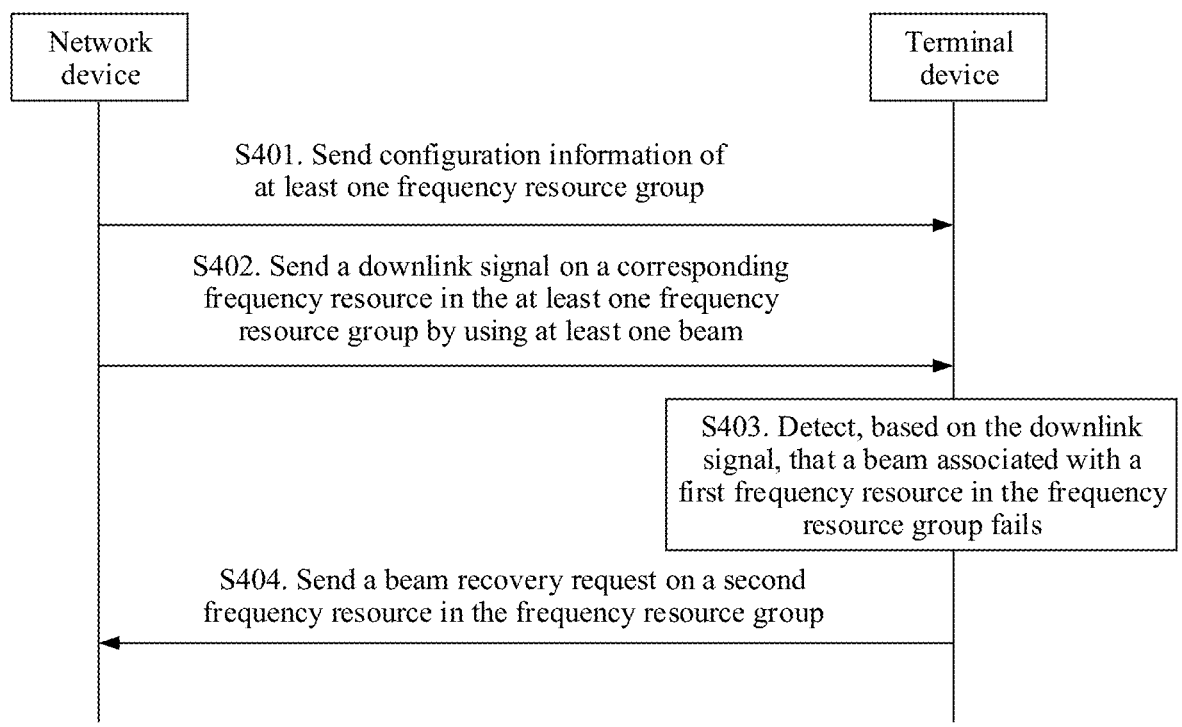
FIG. 12a is another schematic flowchart of a communication method according to an embodiment of the present invention.

FIG. 12a is a schematic flowchart of a communication method according to an embodiment. In this embodiment, the method includes:

S401. A network device sends configuration information of at least one frequency resource group to a terminal device, and the terminal device receives the configuration information of the one or more frequency resources from the network device.

The network device may send the configuration information of the at least one frequency resource group by using any one of RRC signaling, a MAC-CE message, or DCI. Each frequency resource group includes at least two frequency resources, each frequency resource corresponds to at least one beam, and the configuration information includes an identifier of each frequency resource group and an identifier of each frequency resource. A frequency resource in the frequency resource group may be a CC or a BP. Frequency resources in each frequency resource group may have or may not have a QCL relationship.

S402. The network device sends, by using at least one beam, a downlink signal on a corresponding frequency resource in the at least one frequency resource group, and the terminal device receives, by using one beam, the downlink signal on the corresponding frequency resource in the at least one frequency resource group.

One or more downlink signals are configured for each frequency resource in the frequency resource group, and the network device sends the downlink signal by using the frequency resource group. The downlink signal may be an uplink reference signal, for example, a sounding reference signal (SRS), or may be a downlink signal, for example, a CSI-RS or an SS block.

S403. The terminal device detects, based on the downlink signal, that a beam associated with a first frequency resource in the frequency resource group fails.

The frequency resource group is any one of the at least one frequency resource group, the frequency resource group includes a first frequency resource and a second frequency resource, and the first frequency resource and the second frequency resource are two different frequency resources. A physical layer of the terminal device measures a signal quality parameter of a downlink signal associated with the first frequency resource, to detect that a beam fails. For a specific process, refer to the foregoing descriptions. Details are not described herein again.

For example, according to the example in S301, the terminal device detects that a beam 1 associated with a carrier 1 fails.

S404. The terminal device sends a beam recovery request on a second frequency resource in the frequency resource group.

The configuration information further includes a relationship between a downlink signal on a frequency resource and a transmission resource. In other words, for any frequency resource in the frequency resource group, a downlink signal on the frequency resource has an association relationship with one or more transmission resources in the frequency resource group. The transmission resource is a resource that is in the frequency resource group and that is used to send the beam recovery request. For example, the transmission resource may be a random access channel (RACH) resource in the frequency resource group.

In a possible implementation, the terminal device sends the beam recovery request by using a transmission resource on the second frequency resource, where the beam recovery request indicates that a beam on the first frequency resource fails.

In a possible implementation, the terminal device determines a plurality of transmission resources on the second frequency resource based on the foregoing association relationship, and the terminal device sends the beam recovery request based on the plurality of transmission resources. The foregoing relationship is prestored or preconfigured for the network device or the terminal device. In this way, the network device or the terminal device may learn, based on a transmission resource used for the received beam recovery request, that the beam on the first frequency resource fails.

In a possible implementation, the association relationship is specifically:

an association relationship between the transmission resource and at least one of the following information:

an identifier of the downlink signal, the identifier of the frequency resource, the identifier of the frequency resource group, an identifier of an antenna port, an identifier of an antenna port group, and beam indication information.

In a possible implementation, the association relationship is specifically:

in a case of k=0, 1, 2, or 3, $r_n$=2k+(0 or/and 1)+n;

in a case of k=4, 5, 6, or 7, $r_n$=k+4+n; where k is an index of a downlink signal on a frequency resource, n is an index of the frequency resource, and $r_n$ is an index of a transmission resource on the frequency resource.

In a possible implementation, the downlink signal is any one of a CSI-RS, an SRS, and a synchronization signal block (SS block).

It should be noted that a beam recovery method in a downlink direction described in this embodiment is also applicable to a beam recovery process in an uplink direction, namely, a direction from a terminal device to a network device, and therefore this embodiment is also applicable.

In a possible implementation, the configuration information includes:

at least one of a first phase count value or a first phase time window of the frequency resource group, and at least one of a second phase count value, a second phase time window, and timing duration of the frequency resource group; and/or at least one of a first phase count value or a first phase time window of each frequency resource in the frequency resource group, and at least one of a second phase count value, a second phase time window, and timing duration of each frequency resource in the frequency resource group.

In a possible implementation, the configuration information further includes:

the identifier of the frequency resource group, an identifier of a reference frequency resource in the frequency resource group, an identifier of each frequency resource in the frequency resource group, a mapping relationship between the frequency resource in the frequency resource group and a beam, and beam indication information of at least one beam associated with each frequency resource in the frequency resource group, where the beam indication information includes at least one of a beam number and a downlink signal resource number.

In a possible implementation, the configuration information further includes:

at least one of an antenna port number, a time-frequency resource location, and a period of a downlink signal on each frequency resource in the frequency resource group.

In a possible implementation, periods of downlink signals on the frequency resource group are different.

Figure 12B:
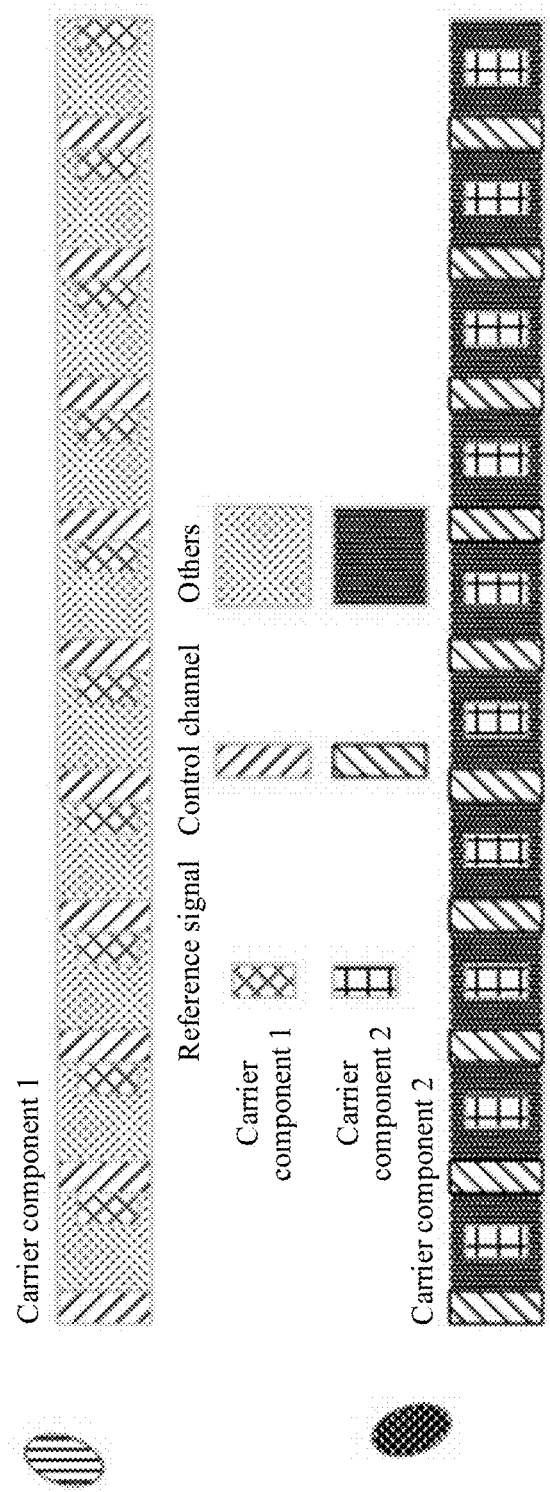
FIG. 12b is still another schematic structural diagram of a carrier component according to an embodiment of the present invention.

FIG. 12b is a schematic structural diagram of a carrier component. It can be seen from FIG. 12b that, a carrier component group includes a carrier component 1 and a carrier component 2, the carrier component 1 and the carrier component 2 each are associated with one beam, and a beam associated with the carrier component 1 does not have a QCL relationship with a beam associated with the carrier component 2. Therefore, the two beams have a different beam direction. Downlink signals and control channels are configured for the carrier component 1 and the carrier component 2, and the downlink signal on the carrier component 1 has a different time-frequency location from and a same period as the downlink signal on the carrier component 1.

In a possible implementation, each beam has a QCL relationship.

In a possible implementation, the configuration information further includes:

QCL information of beams that have a QCL relationship in beams associated with the frequency resource group and QCL identifiers of the beams that have a QCL relationship in the beams associated with the frequency resource group.

In a possible implementation, the frequency resource is a carrier component CC or a bandwidth part BP.

It should be noted that, for descriptions and examples of parameters included in the foregoing configuration information, refer to the foregoing descriptions. Details are not described herein again.

In the method described in FIG. 12a, when detecting that a beam on one frequency resource in the frequency resource group fails, a terminal device sends a beam recovery request on another frequency resource in the frequency resource group.

In this way, the terminal can perform beam recovery by using a plurality of beams, and this increases a probability of beam recovery.

Figure 13:
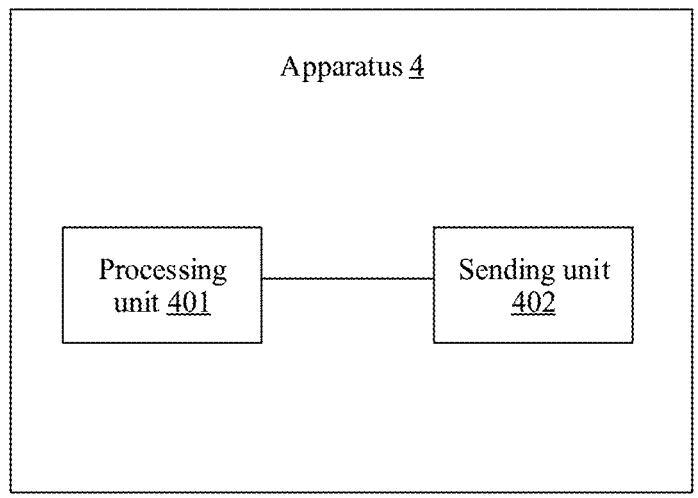
FIG. 13 is a schematic structural diagram of a communications apparatus according to an embodiment of the present invention.

It should be noted that the apparatus 4 shown in FIG. 13 may implement the embodiment shown in FIG. 11a, and the apparatus 4 includes a processing unit 401 and a sending unit 402. The processing unit 401 is configured to configure at least one frequency resource group, where each frequency resource group includes at least two frequency resources. For example, the processing unit 401 performs step S301 in FIG. 11a. The sending unit 402 is configured to send configuration information of the at least one frequency resource group to a terminal device. The configuration information includes information indicating that frequency resources in each frequency resource group have a quasi co-location QCL relationship. The sending unit 402 is further configured to send, by using at least one beam, a downlink signal on a corresponding frequency resource in the at least one frequency resource group, where each frequency resource is associated with one beam. For example, the sending unit 402 performs steps S302 and S303 in FIG. 11a. The apparatus 4 may be a network device, or the apparatus 4 may be a field programmable gate array (FPGA), a dedicated integrated chip, a system on chip (SoC), a central processing unit (CPU), a network processor (NP), a digital signal processing circuit, or a micro controller (MCU) that implements a related function, or may be a programmable logic controller (PLD) or another integrated chip.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver, and a sending unit may be a transmitter.

The embodiment and the corresponding method in FIG. 11a are based on a same concept, the technical effects brought by the two embodiments are also the same. For a specific process, refer to descriptions in the method embodiment in FIG. 11a, and details are not described herein again.

Figure 14:
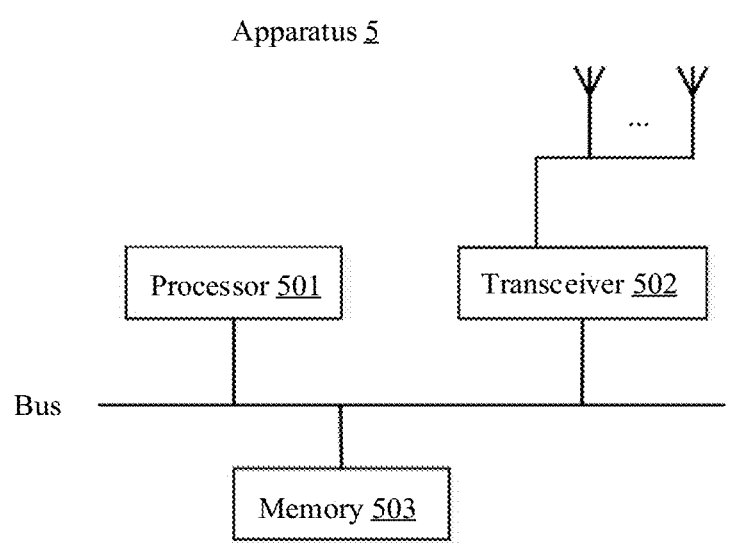
FIG. 14 is another schematic structural diagram of a communications apparatus according to an embodiment of the present invention.

As shown in FIG. 14, an embodiment further provides an apparatus 5.

In a possible design, the apparatus 5 is a network device, and the network device includes:

a transceiver 503, configured to store a program and data. There may be one or more memories, and a type of the memory may be any form of storage medium. For example, the memory may be a random access memory (RAM), a read-only memory (ROM), or a flash memory. The memory 502 may be located in a terminal device alone, or may be located inside the processor 501.

The processor 501 is configured to execute program code stored in the memory 502, and when the program code is executed, the processor 501 is configured to configure at least one frequency resource group. Each frequency resource group includes at least two frequency resources, and each frequency resource is associated with at least one beam. For example, the processor 501 is configured to perform step S301 in FIG. 11a.

The transceiver 503 is configured to receive and send a signal. The transceiver may be used as an independent chip, may be a transceiver circuit in the processor 501, or may be used as an input/output interface. The transceiver may be at least one of a transmitter or a receiver. The transmitter is configured to perform a sending step in the apparatus. The receiver is configured to perform a receiving step in the apparatus. Optionally, the transceiver 503 may further include a transmit antenna and a receive antenna. The transmit antenna and the receive antenna may be two separately disposed antennas, or may be integrated into one antenna. The transceiver 503 is configured to send configuration information of the at least one frequency resource group to the terminal device. The configuration information includes information indicating that frequency resources in each frequency resource group have a quasi co-location QCL relationship. The transceiver 503 is further configured to send, by using at least one beam, a downlink signal on a corresponding frequency resource in the at least one frequency resource group. For example, the transceiver 503 is configured to perform steps S302 and S303 in FIG. 11a.

The transceiver 503, the memory 502, and the processor 501 communicate with each other by using an internal connection path, for example, connected through a bus.

In a possible design, the apparatus 5 may be a chip, for example, may be a communications chip applied in the network device, and configured to implement a related function of the processor 501 in the network device. The chip may be a field programmable gate array, a dedicated integrated chip, a system chip, a central processing unit, a network processor, a digital signal processing circuit, a microcontroller, and a programmable controller or another integrated chip that implements a related function. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (which may be sometimes referred to as code or program). When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state drive (SSD)), or the like.

This embodiment and the corresponding method in FIG. 11a are based on a same concept, the technical effects brought by the two embodiments are also the same. For a specific process, refer to descriptions in the method embodiment in FIG. 11a, and details are not described herein again.

Figure 15:
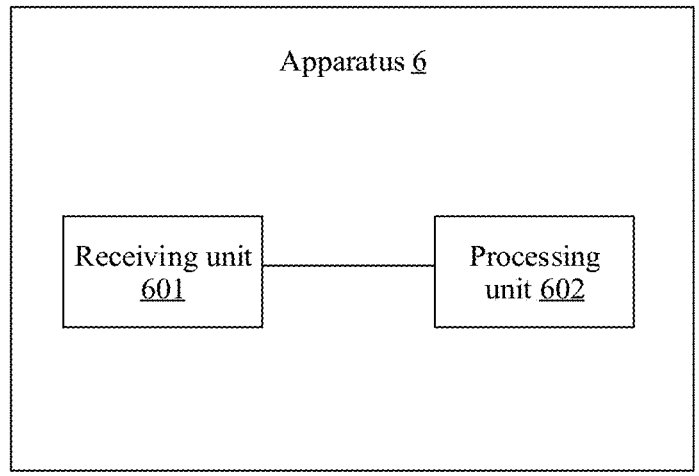
FIG. 15 is still another schematic structural diagram of a communications apparatus according to an embodiment of the present invention.

It should be noted that the apparatus 6 shown in FIG. 15 may implement the embodiment shown in FIG. 11a, and the apparatus 6 includes a receiving unit 601 and a processing unit 602. The receiving unit is configured to: receive configuration information of at least one frequency resource group from a network device, and receive, by using at least one beam, a downlink signal on a corresponding frequency resource in the at least one frequency resource group, where each frequency resource group includes at least two frequency resources, and the configuration information indicates that the frequency resources in each frequency resource group have a quasi co-location QCL relationship. For example, the receiving unit 601 performs steps S202 and S203 in FIG. 11a. The processing unit 602 is configured to monitor the downlink signal. For example, the processing unit 602 is configured to perform steps S304 in FIG. 11a. The apparatus 6 may be a terminal device, or the apparatus 6 may be a field programmable gate array (FPGA), a dedicated integrated chip, a system on chip (SoC), a central processing unit (CPU), a network processor (NP), a digital signal processing circuit, or a micro controller (MCU) that implements a related function, or may be a programmable logic controller (PLD) or another integrated chip.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receiver), and a sending unit may be a transmitter (which may also be referred to as a transmitter).

This embodiment and the corresponding method in FIG. 11a are based on a same concept, the technical effects brought by the two embodiments are also the same. For a specific process, refer to descriptions in the method embodiment in FIG. 11a, and details are not described herein again.

Figure 16:
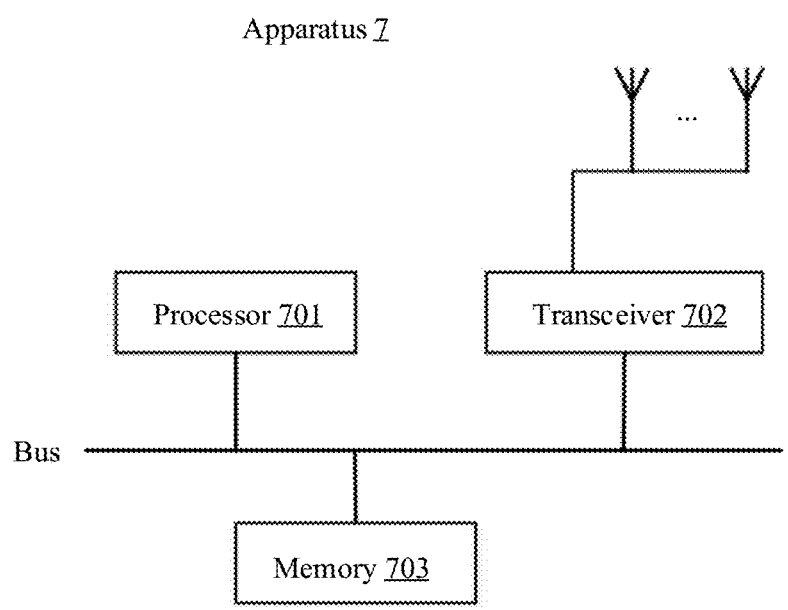
FIG. 16 is yet another schematic structural diagram of a communications apparatus according to an embodiment of the present invention.

As shown in FIG. 16, an embodiment further provides an apparatus 7.

In a possible design, the apparatus 7 is a terminal device, and the terminal device includes:

a memory 703, configured to store a program and data. There may be one or more memories, and a type of the memory may be any form of storage medium. For example, the memory may be a random access memory (RAM), a read-only memory (ROM), or a flash memory. The memory 703 may be located in a terminal device alone, or may be located inside the processor 701.

The transceiver 702 is configured to: receive configuration information of at least one frequency resource group from a network device, and receive, by using at least one beam, a downlink signal on a corresponding frequency resource in the at least one frequency resource group, where each frequency resource group includes at least two frequency resources, and the configuration information indicates that the frequency resources in each frequency resource group have a quasi co-location QCL relationship. For example, the transceiver 702 is configured to perform steps S202 and S203 in FIG. 11a. The transceiver may be used as an independent chip, may be a transceiver circuit in the processor 701, or may be used as an input/output interface. The transceiver 702 may be at least one of a transmitter or a receiver. The transmitter is configured to perform a sending step in the apparatus. The receiver is configured to perform a receiving step in the apparatus.

The processor 701 is configured to execute program code stored in the memory 702, and when the program code is executed, the processor 701 is configured to monitor the downlink signal. For example, the processor 701 is configured to perform step S204 in FIG. 11a.

The transceiver 703, the memory 702, and the processor 701 communicate with each other by using an internal connection path, for example, connected through a bus.

In a possible design, the apparatus 7 may be a chip, for example, may be a communications chip applied in the terminal device, and configured to implement a related function of the processor 701 in the network device. The chip may be a field programmable gate array, a dedicated integrated chip, a system chip, a central processing unit, a network processor, a digital signal processing circuit, a microcontroller, and a programmable controller or another integrated chip that implements a related function. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (which may be sometimes referred to as code or program). When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

This embodiment and the corresponding method embodiment in FIG. 11a are based on a same concept, the technical effects brought by the two embodiments are also the same. For a specific process, refer to descriptions in the method embodiment in FIG. 11a, and details are not described herein again.

Figure 17:
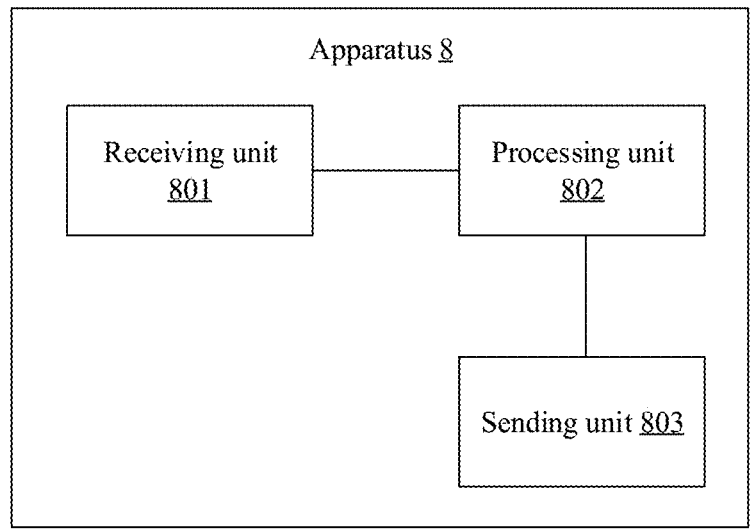
FIG. 17 is still yet another schematic structural diagram of a communications apparatus according to an embodiment of the present invention.

It should be noted that the apparatus 8 shown in FIG. 17 may implement the embodiment shown in FIG. 12a, and the apparatus 8 includes a receiving unit 802, a processing unit 802, and a sending unit 803. The receiving unit 801 is configured to: receive configuration information of at least one frequency resource group, and receive, by using at least one beam, a downlink signal on a corresponding frequency resource in the at least one frequency resource group, where each frequency resource group includes at least two frequency resources, each frequency resource corresponds to at least one beam, and the configuration information includes an identifier of each frequency resource group and an identifier of each frequency resource. For example, the receiving unit 801 performs steps S401 and S402 in FIG. 12a.

The processing unit 802 is configured to: when it is detected based on the downlink signal that a beam associated with a first frequency resource in the frequency resource group fails, instruct the sending unit 803 to send a beam recovery request on a second frequency resource in the frequency resource group. For example, the processing unit 802 performs step S403 in FIG. 12a, and the sending unit 803 performs step S404 in FIG. 12a. The apparatus 8 may be a terminal device, or the apparatus 8 may be a field programmable gate array (FPGA), a dedicated integrated chip, a system on chip (SoC), a central processing unit (CPU), a network processor (NP), a digital signal processing circuit, or a micro controller (MCU) that implements a related function, or may be a programmable logic controller (PLD) or another integrated chip.

When the communications apparatus is a chip, a receiving unit may be an input unit, for example, an input circuit or a communications interface; and a sending unit may be an output unit, for example, an output circuit or a communications interface. When the communications apparatus is a terminal device, a receiving unit may be a receiver (which may also be referred to as a receiver), and a sending unit may be a transmitter (which may also be referred to as a transmitter).

This embodiment and the corresponding method embodiment in FIG. 12a are based on a same concept, the technical effects brought by the two embodiments are also the same. For a specific process, refer to descriptions in the method embodiment in FIG. 12a, and details are not described herein again.

Figure 18:
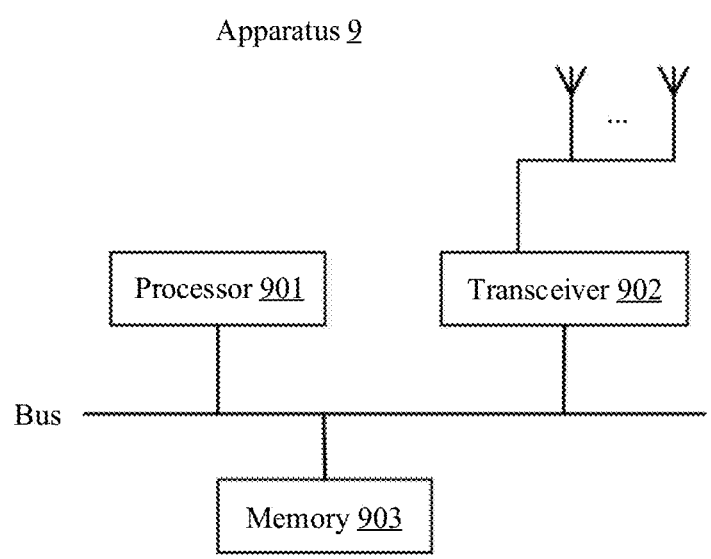
FIG. 18 is a further schematic structural diagram of a communications apparatus according to an embodiment of the present invention.

As shown in FIG. 18, an embodiment further provides an apparatus 9.

In a possible design, the apparatus 9 of FIG. 17 is a terminal device, and the terminal device includes:

a memory 902, configured to store a program and data. There may be one or more memories, and a type of the memory may be any form of storage medium. For example, the memory may be a random access memory (RAM), a read-only memory (ROM), or a flash memory. The memory 902 may be located in a terminal device alone, or may be located inside the processor 901.

The transceiver 903 is configured to: receive configuration information of at least one frequency resource group, and receive, by using at least one beam, a downlink signal on a corresponding frequency resource in the at least one frequency resource group, where each frequency resource group includes at least two frequency resources, each frequency resource corresponds to at least one beam, and the configuration information includes an identifier of each frequency resource group and an identifier of each frequency resource. For example, the transceiver 903 is configured to perform steps S401, and S402 in FIG. 12a. The transceiver may be used as an independent chip, may be a transceiver circuit in the processor 901, or may be used as an input/output interface. The transceiver 902 may be at least one of a transmitter or a receiver. The transmitter is configured to perform a sending step in the apparatus. The receiver is configured to perform a receiving step in the apparatus.

The processor 901 is configured to execute program code stored in the memory 902, and when the program code is executed, the processor 901 is configured to: when it is detected, based on the downlink signal, that a beam associated with a first frequency resource in the frequency resource group fails, instruct the transceiver 903 to send a beam recovery request on a second frequency resource in the frequency resource group. For example, the processor 901 is configured to perform step S404 in FIG. 12a.

The transceiver 903, the memory 902, and the processor 901 communicate with each other by using an internal connection path, for example, connected through a bus.

In a possible design, the apparatus 9 may be a chip, for example, may be a communications chip applied in the terminal device, and configured to implement a related function of the processor 901 in the network device. The chip may be a field programmable gate array, a dedicated integrated chip, a system chip, a central processing unit, a network processor, a digital signal processing circuit, a microcontroller, and a programmable controller or another integrated chip that implements a related function. Optionally, the chip may include one or more memories, configured to store program code. When the program code is executed, the processor is enabled to implement a corresponding function.

All or some of the chips may be implemented by using software, hardware, firmware, or any combination thereof. When a software program is used to implement the chips, the chips may be implemented completely or partially in a form of a computer program product. The computer program product includes one or more computer program instructions (which may be sometimes referred to as code or program). When the computer program instructions are loaded and executed on a computer, the procedure or functions according to the embodiments of this application are all or partially generated. The computer may be a general-purpose computer, a special-purpose computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may be aware that, in combination with the examples described in the embodiments disclosed in this specification, units and algorithm steps may be implemented by electronic hardware or a combination of computer software and electronic hardware. Whether the functions are performed by hardware or software depends on particular applications and design constraint conditions of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments, and details are not described herein again.

In the several embodiments provided in this application, it should be understood that the disclosed system, apparatus, and method may be implemented in other manners. For example, the described apparatus embodiment is merely an example. For example, division into the units is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units are integrated into one unit.

All or some of the chips may be implemented by using software, hardware, firmware, or any combination thereof. When software is used to implement the embodiments, the embodiments may be implemented completely or partially in a form of a computer program product. The computer program product includes one or more computer instructions. When the computer program instructions are loaded and executed on the computer, the procedure or functions according to the embodiments are all or partially generated. The computer may be a general-purpose computer, a dedicated computer, a computer network, or other programmable apparatuses. The computer instruction may be stored in a computer-readable storage medium, or may be transmitted by using the computer-readable storage medium. The computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid-state drive (SSD)), or the like.

A person of ordinary skill in the art may understand that all or some of the processes of the methods in the embodiments may be implemented by a computer program instructing relevant hardware. The program may be stored in a computer-readable storage medium. When the program is run, the procedure of the methods in the embodiments are performed. The foregoing storage medium includes: any medium that can store program code, such as a ROM, a random access memory RAM, a magnetic disk, or an optical disc.

What is claimed is:

1. A communication method comprising:
   receiving, by a terminal device, configuration information of at least one carrier component group;
   receiving, by the terminal device and using at least one beam, a downlink signal on a corresponding carrier component in the at least one carrier component group, wherein each carrier component group comprises at least two carrier components, each carrier component corresponds to at least one beam, and the configuration information comprises an identifier of each carrier component group and an identifier of each carrier component;
   in response to detecting, by the terminal device based on the downlink signal, that a beam associated with a first carrier component in a carrier component group fails, sending, by the terminal device, a beam recovery request on a second carrier component in the carrier component group;
   wherein the configuration information further comprises an association relationship between a downlink signal on a carrier component and a transmission resource; and
   wherein the sending, by the terminal device, a beam recovery request on a second carrier component in the carrier component group comprises:
   sending the beam recovery request based on one or more transmission resources associated with a downlink signal on the first carrier component.

2. The method according to claim 1, wherein the association relationship comprises: an association relationship between the transmission resource and at least one of the following information:
   an identifier of the downlink signal, an identifier of the carrier component, an identifier of the carrier component group, an identifier of an antenna port, an identifier of an antenna port group, and beam indication information.

3. The method according to claim 1, wherein the downlink signal is a channel state information-reference signal (CSI-RS) or a synchronization signal block (SS block).

4. A terminal device, comprising:
   a receiver configured to receive configuration information of at least one carrier component group, and receive, by using at least one beam, a downlink signal on a corresponding carrier component in the at least one carrier component group, wherein each carrier component group comprises at least two carrier components, each carrier component corresponds to at least one beam, and the configuration information comprises an identifier of each carrier component group and an identifier of each carrier component;
   a transmitter; and
   a processor configured to
   instruct the transmitter to send, when it is detected, by the terminal device, based on the downlink signal that a beam associated with a first carrier component in a carrier component group fails, a beam recovery request on a second carrier component in the carrier component group;
   wherein the configuration information further comprises an association relationship between a downlink signal on a carrier component and a transmission resource; and
   wherein the transmitter is further configured to send the beam recovery request based on one or more transmission resources associated with a downlink signal on the first carrier component.

5. The terminal device according to claim 4, wherein the association relationship comprises:
   an association relationship between the transmission resource and at least one of the following information:
   an identifier of the downlink signal, an identifier of the carrier component, an identifier of the carrier component group, an identifier of an antenna port, an identifier of an antenna port group, and beam indication information.

6. The terminal device according to claim 4, wherein the downlink signal is a channel state information-reference signal (CSI-RS) or a synchronization signal block (SS block).

7. A non-transitory computer-readable storage medium storing a computer program, which when executed by a processor, causes the processor to carry out the method comprising:

receiving, by a terminal device, configuration information of at least one carrier component group;

receiving, by the terminal device and using at least one beam, a downlink signal on a corresponding carrier component in the at least one carrier component group, wherein each carrier component group comprises at least two carrier components, each carrier component corresponds to at least one beam, and the configuration information comprises an identifier of each carrier component group and an identifier of each carrier component; and in response to detecting, by the terminal device based on the downlink signal, that a beam associated with a first carrier component in a carrier component group fails, sending, by the terminal device, a beam recovery request on a second carrier component in the carrier component group;

wherein the configuration information further comprises an association relationship between a downlink signal on a carrier component and a transmission resource; and wherein the sending, by the terminal device, a beam recovery request on a second carrier component in the carrier component group comprises:

sending the beam recovery request based on one or more transmission resources associated with a downlink signal on the first carrier component.

8. The computer-readable storage medium according to claim 7, wherein the association relationship comprises:

an association relationship between the transmission resource and at least one of the following information:

an identifier of the downlink signal, an identifier of the carrier component, an identifier of the carrier component group, an identifier of an antenna port, an identifier of an antenna port group, and beam indication information.

9. The computer-readable storage medium according to claim 7, wherein the downlink signal is a channel state information-reference signal (CSI-RS) or a synchronization signal block (SS block).

* * * * *

UNITED STATES PATENT AND TRADEMARK OFFICE
CERTIFICATE OF CORRECTION

| | |
|---|---|
| PATENT NO. | : 11,316,579 B2 |
| APPLICATION NO. | : 16/784306 |
| DATED | : April 26, 2022 |
| INVENTOR(S) | : Peng Guan et al. |

It is certified that error appears in the above-identified patent and that said Letters Patent is hereby corrected as shown below:

On the Title Page

Item (54), in Column 1, in "Title", Line 2, delete "COMMUNICATIONS APPARATUS" and insert -- APPARATUS USING RESOURCE AGGREGATION --.

In the Specification

In Column 1, Line 2, delete "COMMUNICATIONS APPARATUS" and insert -- APPARATUS USING RESOURCE AGGREGATION --.

In the Claims

In Column 53, Line 11, in Claim 7, after "component;" delete "and".

Signed and Sealed this
Second Day of August, 2022

Katherine Kelly Vidal
*Director of the United States Patent and Trademark Office*